(12) United States Patent
Cikanek et al.

(10) Patent No.: US 6,827,167 B2
(45) Date of Patent: Dec. 7, 2004

(54) HYBRID ELECTRIC VEHICLE TORQUE DISTRIBUTION

(75) Inventors: Susan Rebecca Cikanek, Wixom, MI (US); Kathleen Ellen Bailey, Dearborn, MI (US); Natarajan Sureshbabu, Canton, MI (US); Barry Kay Powell, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/063,188

(22) Filed: Mar. 28, 2002

(65) Prior Publication Data

US 2003/0183431 A1 Oct. 2, 2003

(51) Int. Cl.$^7$ ................................................. B60K 1/00
(52) U.S. Cl. ............................ 180/65.6; 701/22; 477/7
(58) Field of Search ............................... 180/65.2, 65.3, 180/65.6, 65.8; 701/22, 51, 58; 477/3, 7

(56) References Cited

U.S. PATENT DOCUMENTS

| 5,549,172 | A | | 8/1996 | Mutoh et al. | |
| 5,896,283 | A | * | 4/1999 | Usami | 363/98 |
| 5,899,286 | A | * | 5/1999 | Yamaguchi | 180/65.3 |
| 5,935,040 | A | * | 8/1999 | Tabata et al. | 477/3 |
| 6,054,844 | A | * | 4/2000 | Frank | 322/16 |
| 6,064,934 | A | * | 5/2000 | Zhang | 701/51 |
| 6,356,817 | B1 | * | 3/2002 | Abe | 701/22 |
| 6,379,281 | B1 | * | 4/2002 | Collins et al. | 477/107 |
| 6,553,287 | B1 | * | 4/2003 | Supina et al. | 701/22 |
| 6,554,088 | B2 | * | 4/2003 | Severinsky et al. | 180/65.2 |

* cited by examiner

*Primary Examiner*—Christopher P. Ellis
*Assistant Examiner*—Kelly E Campbell
(74) *Attorney, Agent, or Firm*—Carlos L. Hanze; Dykema Gossett PLLC

(57) ABSTRACT

A method of distributing a torque demand in a hybrid electric vehicle having an internal combustion engine 200 and an electric motor 202 is provided. In hybrid operation, the motor 202 initially starts the vehicle. When the vehicle desired power demand reaches a first vehicle operational parameter, a controller 214 switches the torque demand to the engine 200. An accelerator pedal 220 has a position sensor 222 which determines a non-fixed pedal 220 first position during transition between the motor 202 and engine 200. The accelerator pedal 220 also has a preset second position wherein a maximum of engine 200 torque is requested. The controller 214, cognizant of the accelerator pedal 220 first and second positions, linearly scales the accelerator pedal 220 to provide a uniform torque-responsive accelerator pedal.

36 Claims, 24 Drawing Sheets

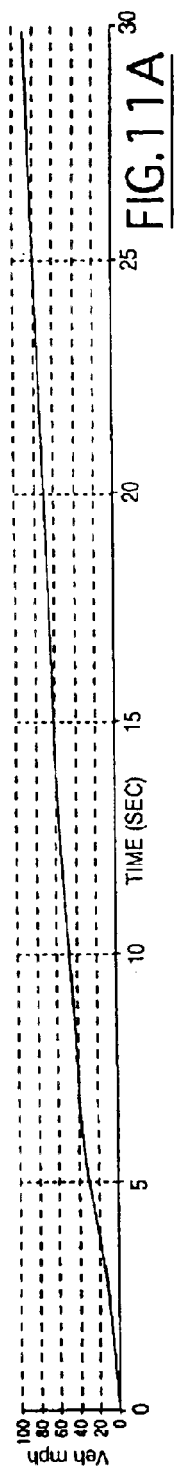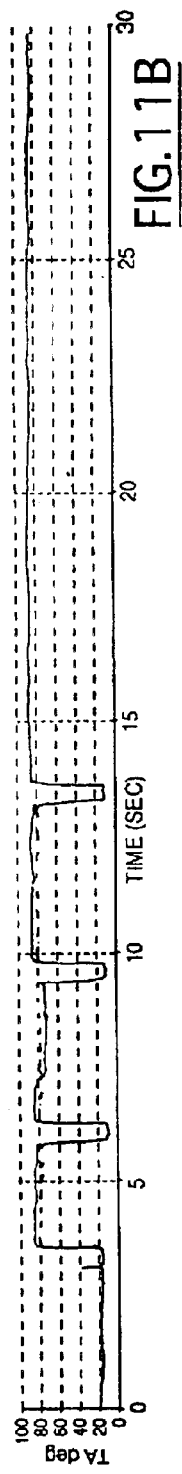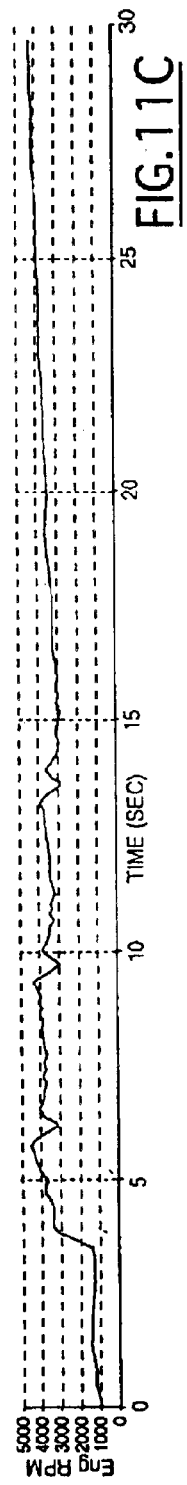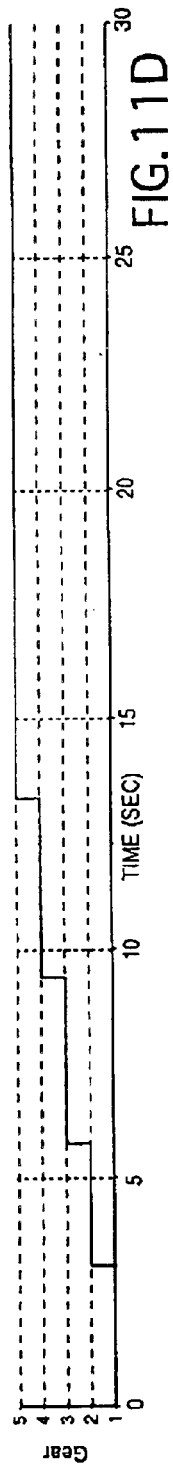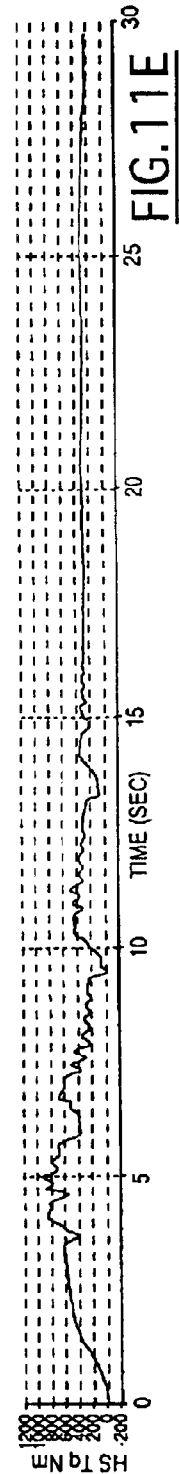

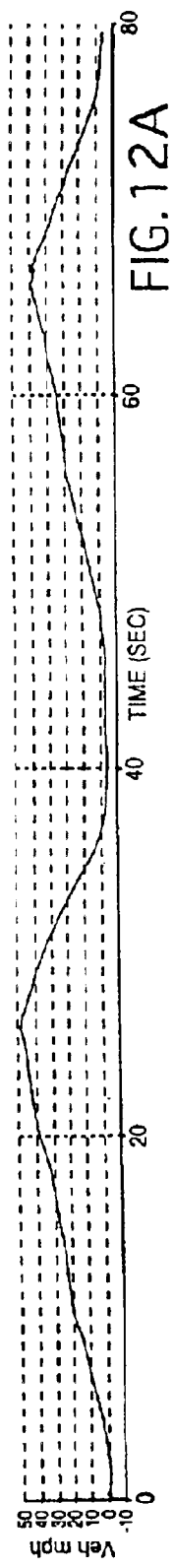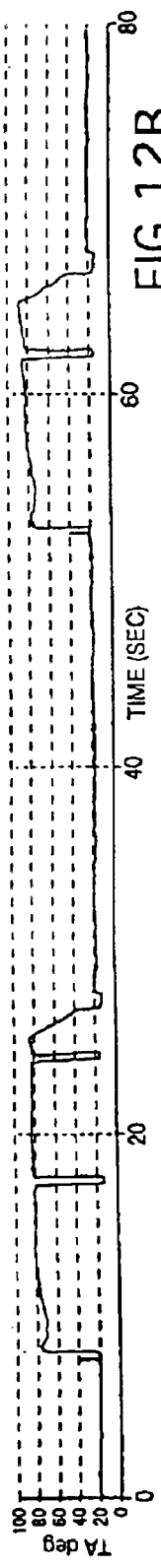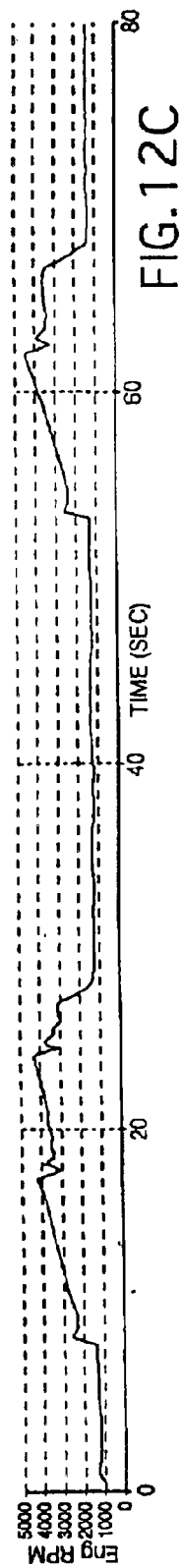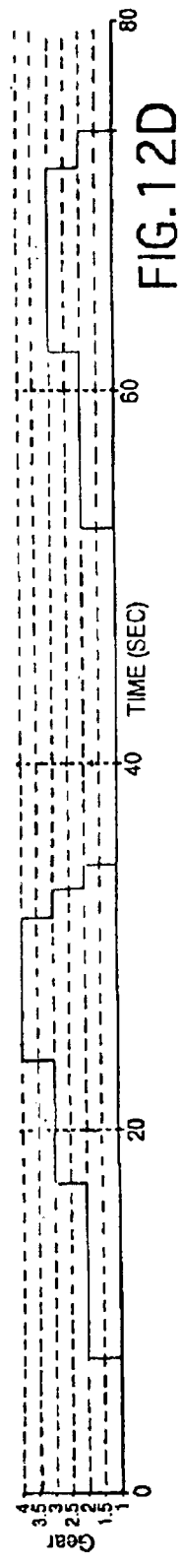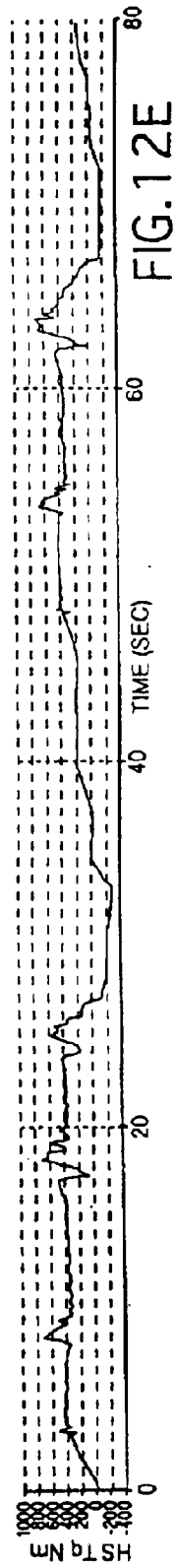

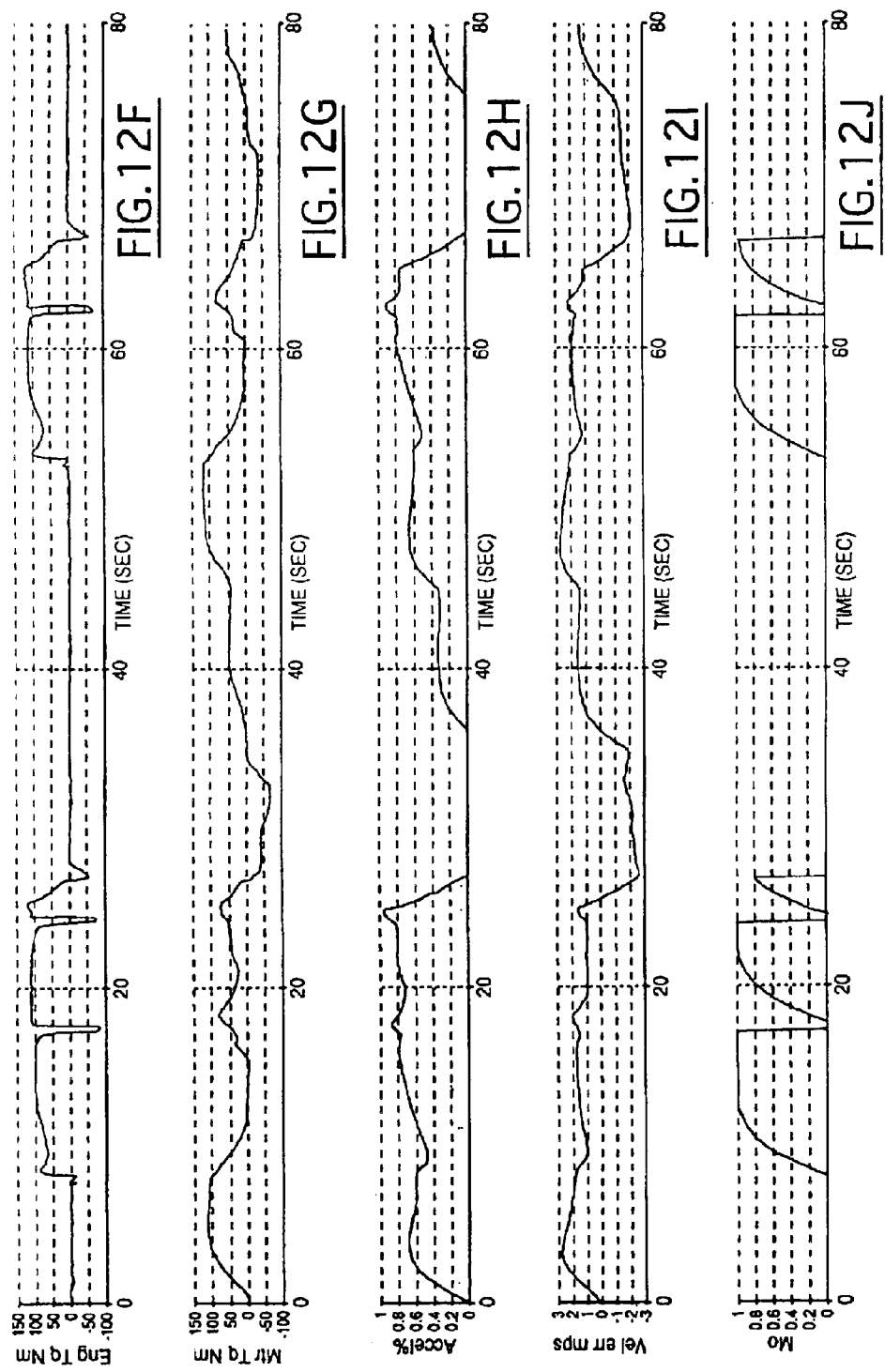

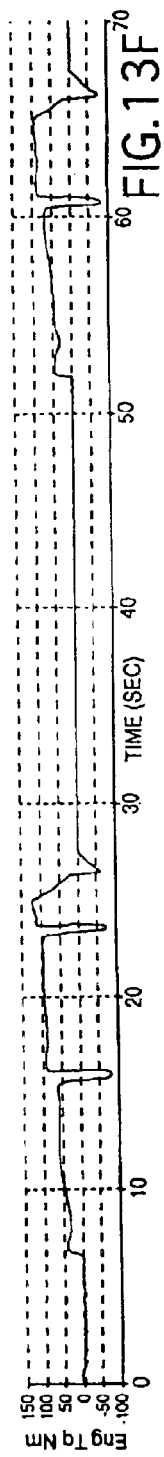
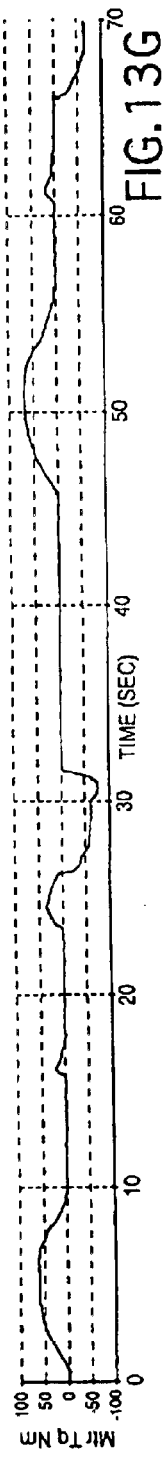
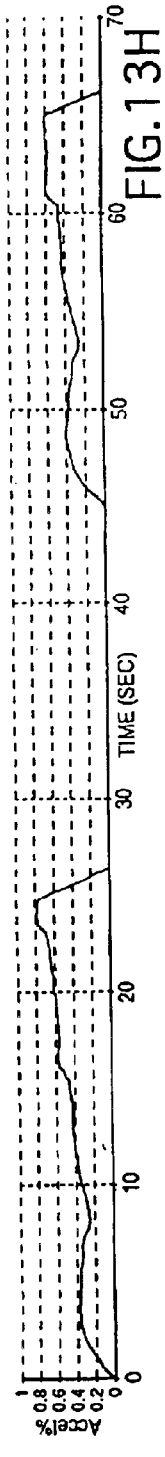
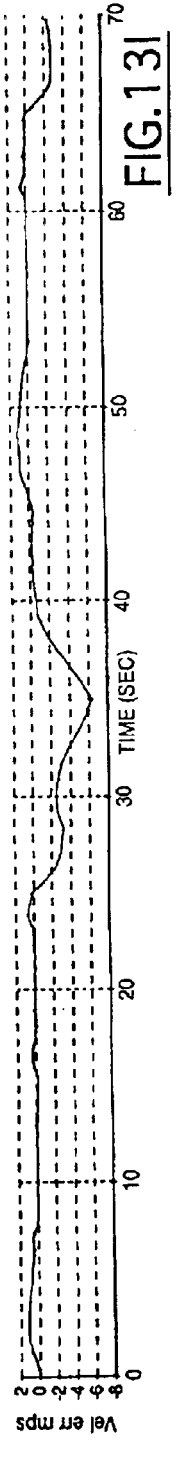
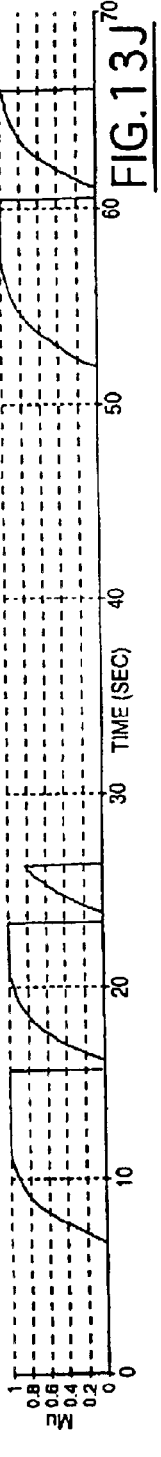

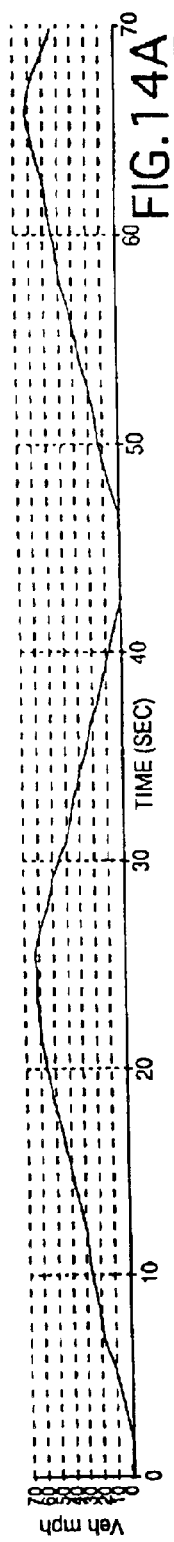
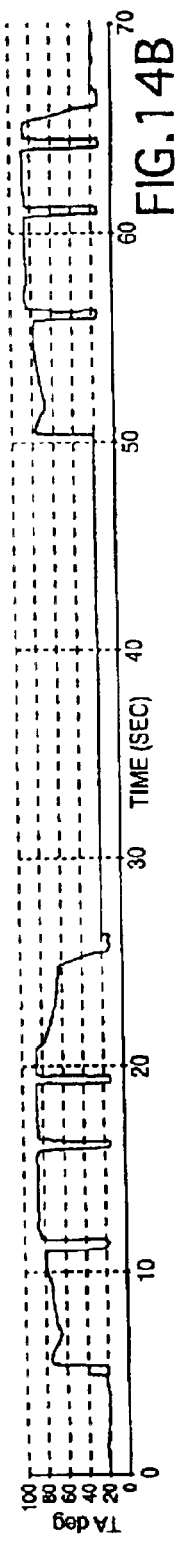
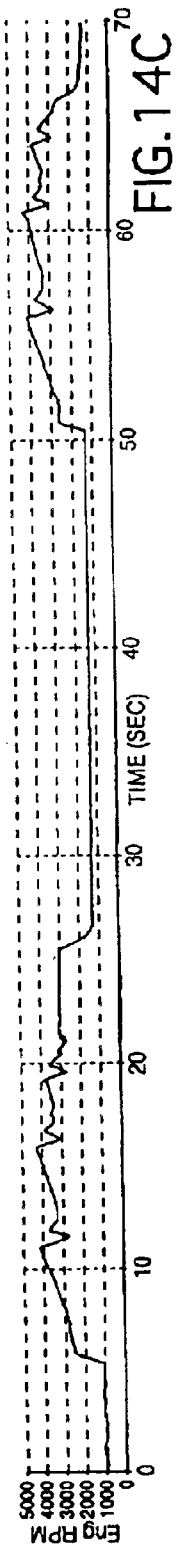
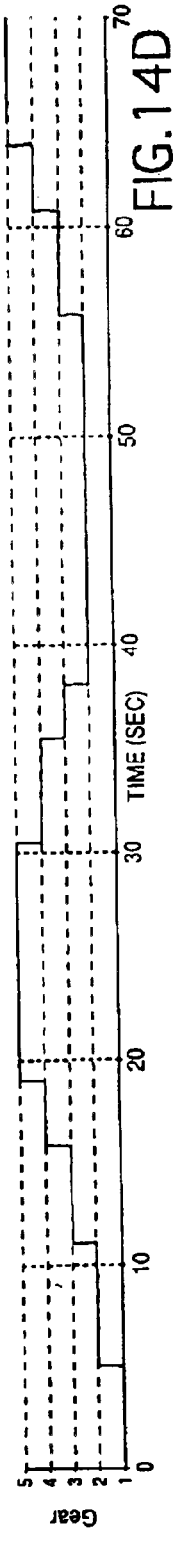
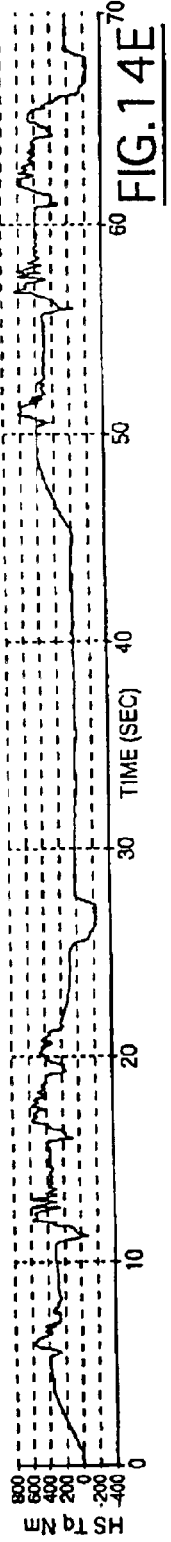

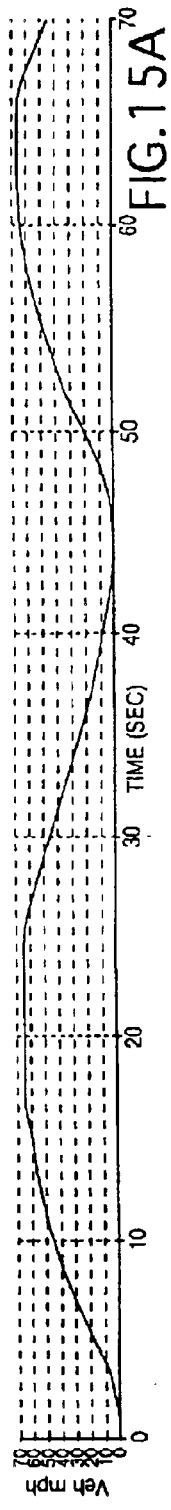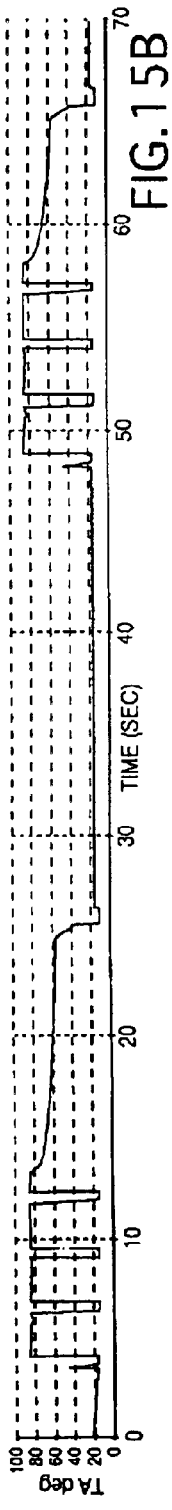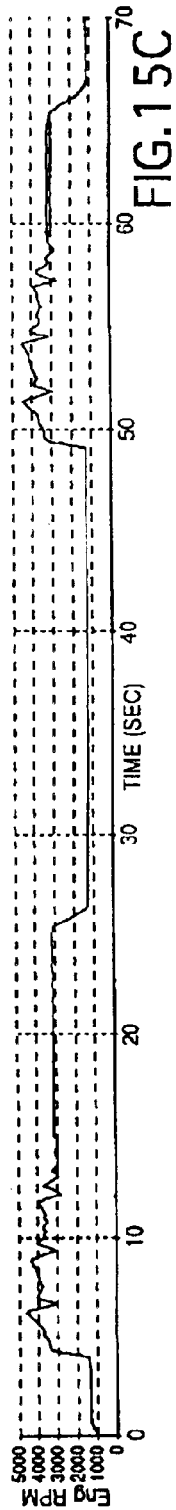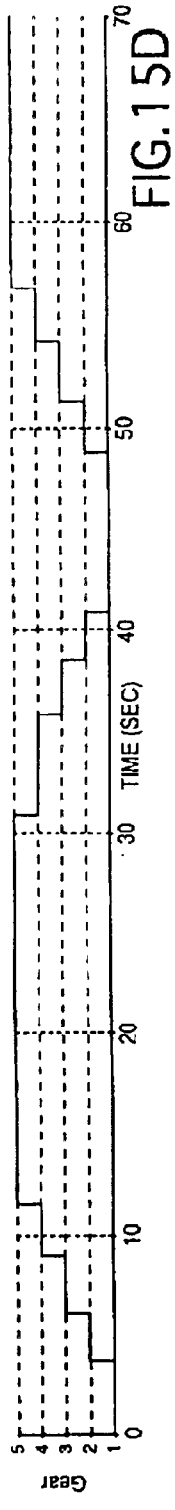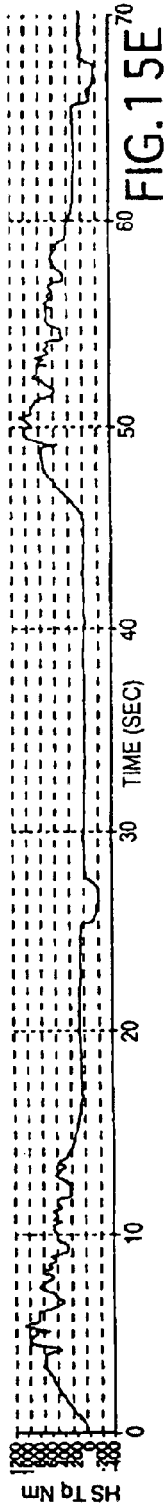

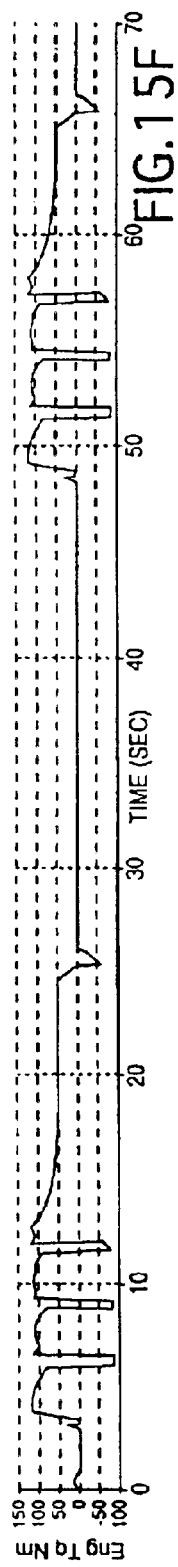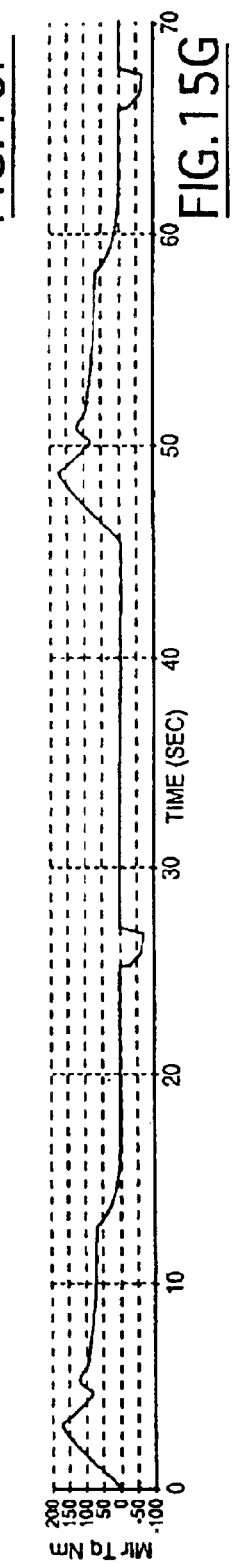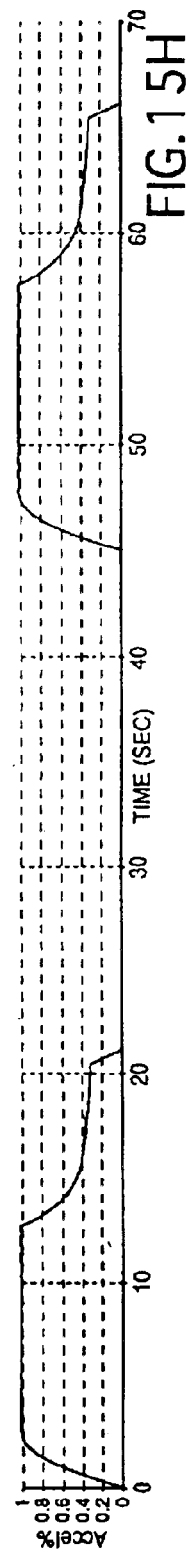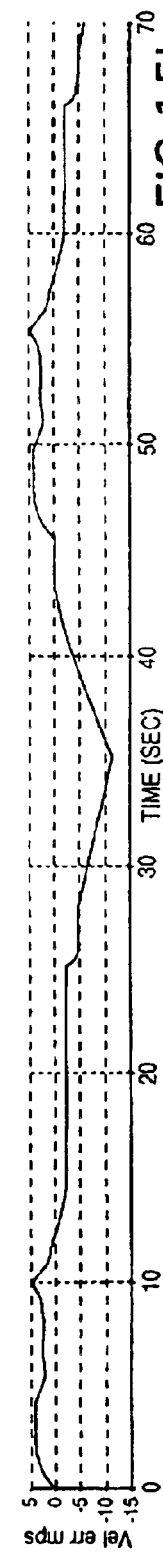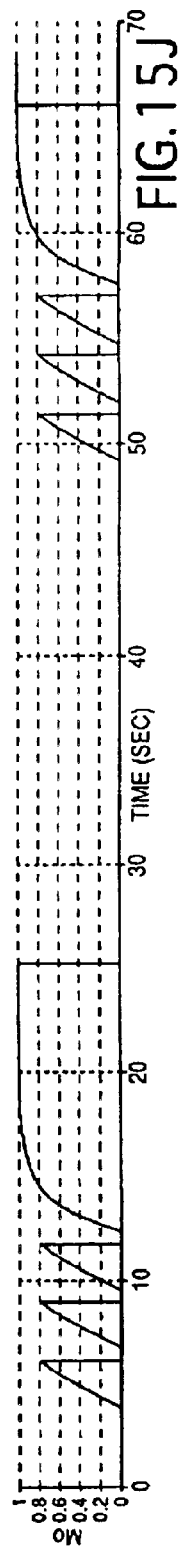

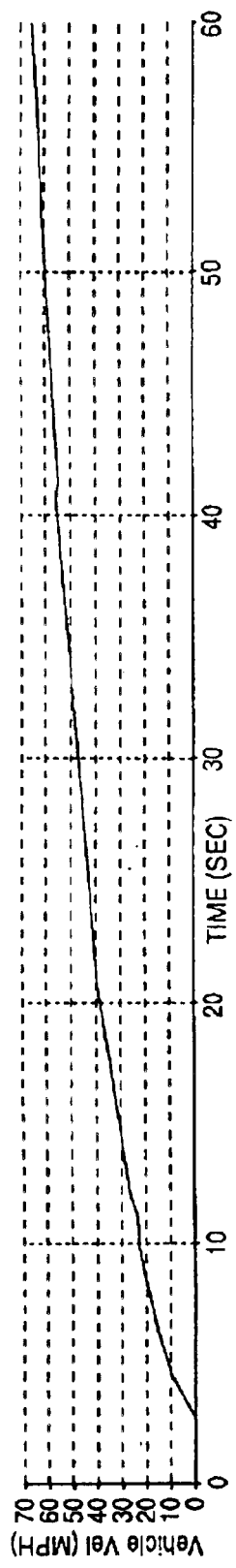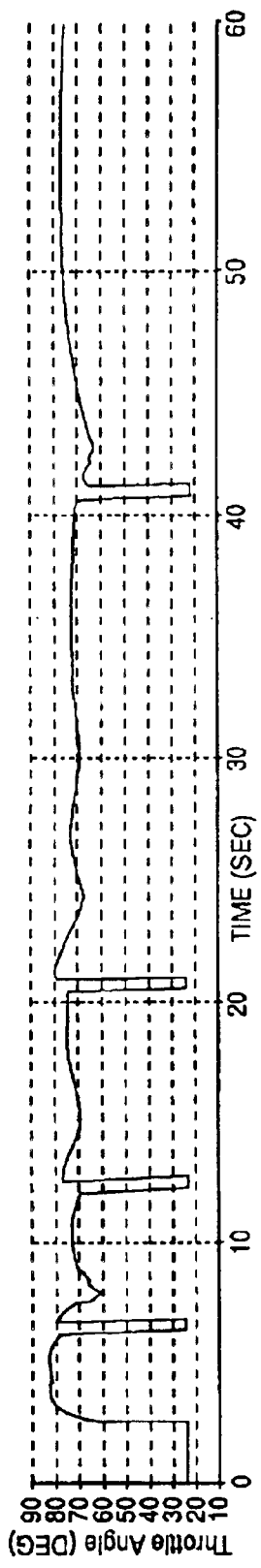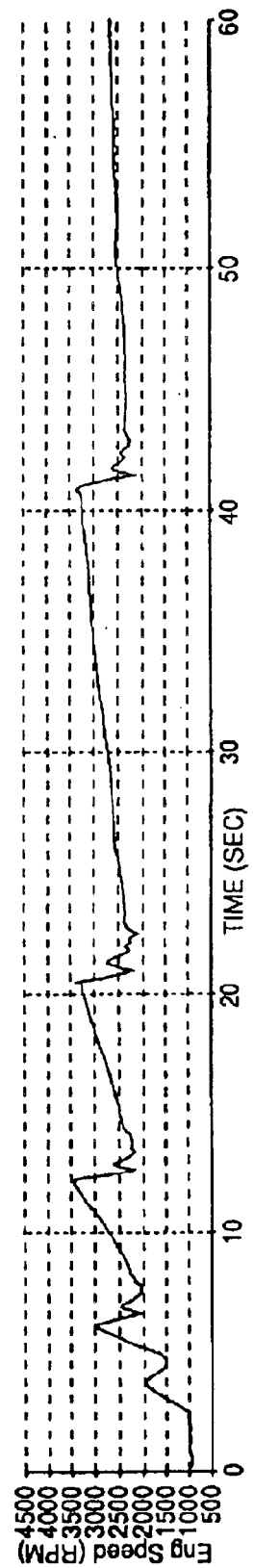

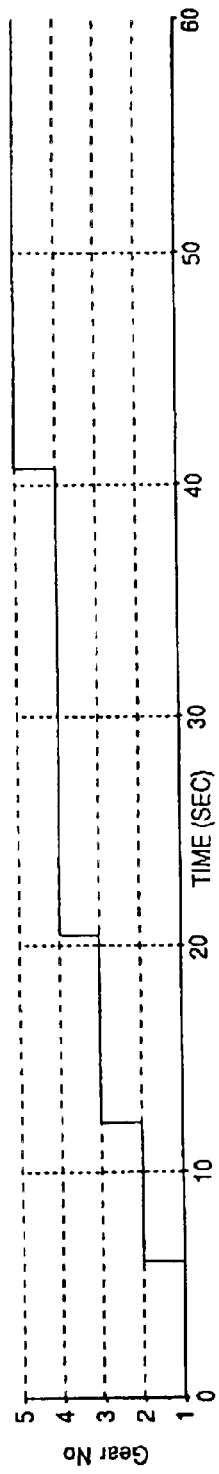
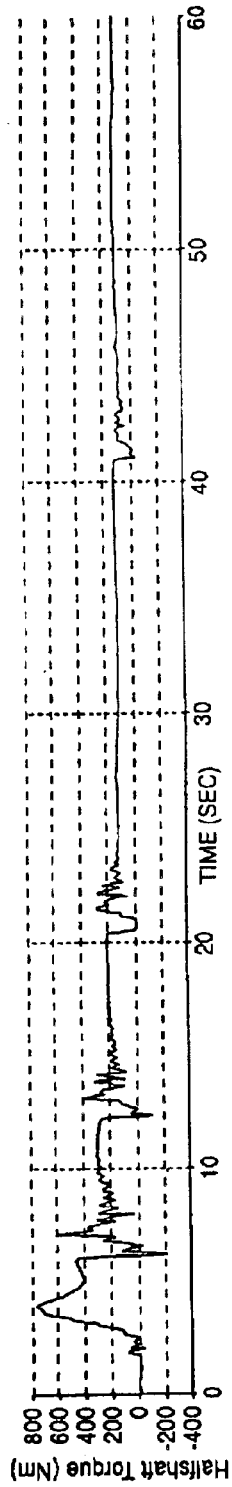
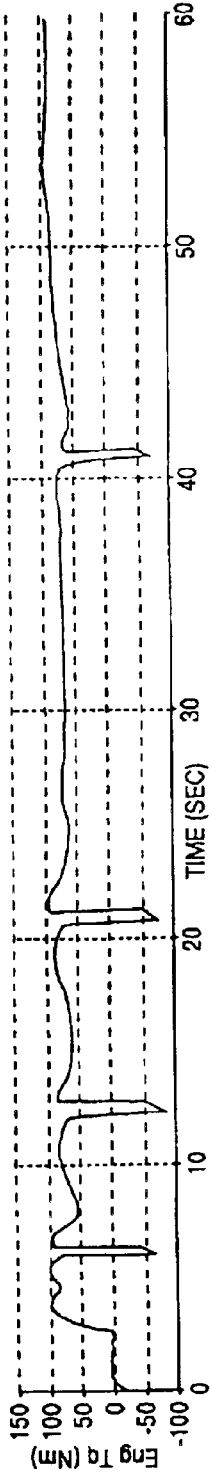
FIG.16D
FIG.16E
FIG.16F

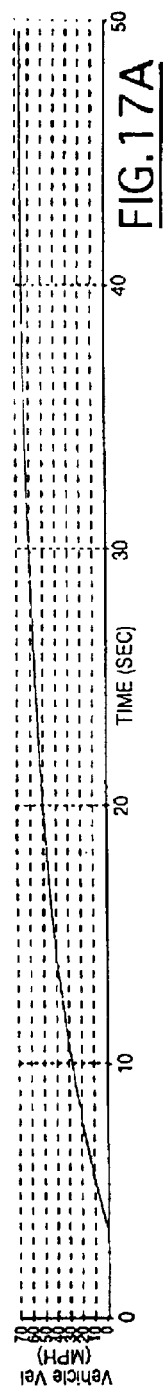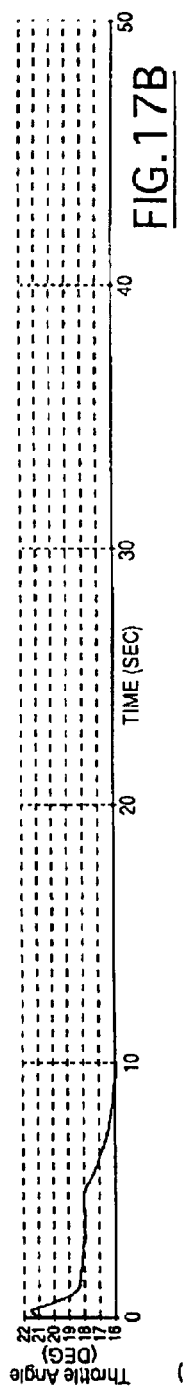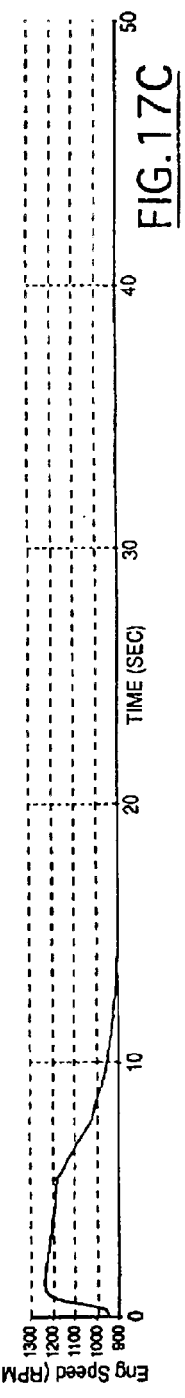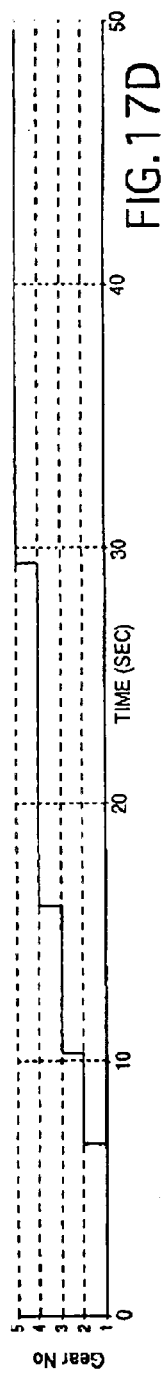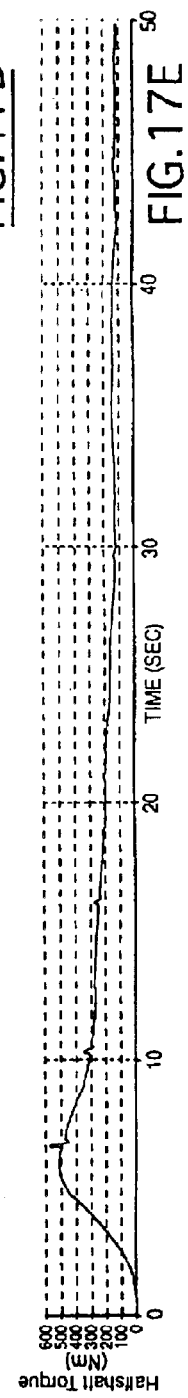

HYBRID ELECTRIC VEHICLE TORQUE DISTRIBUTION

BACKGROUND OF INVENTION

The present invention relates to a hybrid electric vehicle having an electric motor (s) and an internal combustion (IC) engine and a method of control thereof. More particularly, the present invention provides the hybrid electric vehicle with an accelerator pedal which commands torque from either the IC engine or the electric motor in a manner which is essentially non-perceptible to the driver from the operation of an accelerator pedal on a conventional vehicle powered by an IC engine.

The primary objective of the automobile industry is the development of safe vehicles for personal mobility that meet or exceed customer expectations for performance, including acceleration, braking, maneuverability, and comfort, while minimizing the impact on the environment.

The automobile is an integration of many complex non-linear systems, one of which is the powertrain system. A conventional vehicle powertrain consists of an IC engine, transmission, and driveline including a differential and axle system(s) with drive wheels. An electric vehicle powertrain consists of an electric motor, gearing, and driveline including a differential and axle system with drive wheels. Also included are accessories and peripherals connected to the powerplant such as power steering, power brakes, and air conditioning. The vehicle powertrain is a composition of electrical, mechanical, chemical, and thermodynamic devices connected as a nonlinear dynamic integrated system, with the primary objective of providing the power source for transportation.

Essential to the control of any vehicle is the accelerator pedal. The accelerator pedal does not directly control velocity but rather controls a torque demand to the vehicle power train. Accordingly, when the driver of the vehicle wishes to increase their velocity, the accelerator pedal is actuated to place a torque demand upon the vehicle power train. A torque response to the torque demand is a function of many different variables. For a conventional automotive vehicle powered by an IC engine, torque output at the wheels of the vehicle is related to gear ratios of the transmission and the transaxle; engine RPM, engine compression ratio; throttle setting, intake air temperature; emission system performance; valve operation; and ignition system performance. The engine and drive train controllers accommodate the various variables such that the torque output to the driver is mainly a function of a tactile experience foot maneuvering of the accelerator pedal.

The need to reduce fuel consumption and emissions in automobiles and other vehicles predominantly powered by IC engines is well known. Vehicles powered by electric motors attempt to address these needs. Another alternative solution is to combine a smaller IC engine with an electric motor or motors into one vehicle. Such a vehicle combines the advantages of an IC engine vehicle and an electric vehicle and is typically called a hybrid electric vehicle (HEV). See generally, U.S. Pat. No. 5,343,970 (Severinsky).

HEVs have been described in a variety of configurations. Many HEV patents disclose systems where an operator is required to select between an electric and IC operation. In other configurations, the electric motor drives one set of wheels and the IC engine drives a different set of wheels.

Other HEV configurations have been provided wherein the internal combustion engine and the electric motor power a common drive axle. Some configurations wherein the electric motor and IC engine power a common drive axle are referred to as parallel hybrid electric vehicle (PHEV) configurations. One PHEV configuration has an engine and two traction motors utilized to power a common drive axle and the power train of the system has both the engine and the motors on a common side of the differential for the drive axle.

In another configuration commonly referred to as a post-transmission design, an IC engine is connected with a transmission and differential via an engine clutch. An electric motor is torsionally connected with the differential by a separate motor clutch. The post-transmission parallel hybrid power train accordingly can be powered exclusively by the engine or the electric motor or by both power sources simultaneously.

A vehicle that provides torque to a common or different drive axles through two power sources must be able to partition the torque to the two power sources such that fuel economy and emissions are optimized. In addition, the distribution of torque must be invisible to the driver. The driver commands torque through the accelerator pedal and this amount must be determined. It is desirable that this determined torque request be distributed to the power sources in such a way that the car always behaves in a same manner. However, the controller determines to demand torque from the engine or the motor based upon 20 or 30 operational parameters many of which are non-linear. The controller must consider how to distribute torque in order to maximize fuel economy, extend battery life and range, minimize vehicle emissions and at the same time provide an acceptable driving performance for the vehicle. Many of these factors that are considered by the engine controller are non-linear with respect to the torque demanded at the drive axle.

Further complicating the torque distribution matter is the fact that the amount of torque available from the electric motor is a function of the state of charge (SOC) of the HEV's batteries. If the HEV battery has a low state of charge, the torque available from the motor will be low. Conversely, if battery charge is high, torque demand from the motor may be at its maximum. U.S. patents discussing these and other issues related to HEV torque output are U.S. Pat. Nos. 5,549,172; 5,899,286; 5,935,040; and 6,064,934.

Experience has shown that in most situations it is preferable to start an HEV forward from a rest position utilizing the electric motor. Electric motors differ from IC engines in that their maximum torque output is essentially available from a rest position, unlike an IC engine which must reach a predefined high RPM output. When the power demand upon the vehicle reaches a certain level, it is usually preferable to thereafter rely upon torque generation from the IC engine. Periods of braking the vehicle allow the vehicle to charge the batteries using regenerative braking. When traveling at highway speeds and attempting to pass another vehicle where wide open throttle conditions exist, typically both power plants will be run to their maximum capacities.

Considering the aforementioned factors, further complicated by switching gear ratios and other operating conditions, it is essential that the torque output or pedal feel at the accelerator pedal be as constant as possible so that the operator of the vehicle can drive the vehicle with confidence in a manner that he or she is used to in driving conventional vehicles powered by an IC engine alone.

Accordingly, it is desirable to provide a HEV which can be powered at various times by the motor, IC engine alone or with the use of both power plants while at the same time providing a constant pedal feel.

SUMMARY OF INVENTION

To make manifest the above noted desire, a revelation of the present invention is brought forth. In a preferred embodiment the present invention provides a HEV and method of operation thereof where the vehicle is powered by an electric motor and an IC engine. The vehicle is initially powered by the electric motor up to a first vehicle operational parameter level. Typically, the vehicle operational parameter level will be a combination of variables highly dependent upon the power level of the vehicle. Above the first vehicle operation parameter level, the vehicle will be powered by an IC engine. At the time of the transition between the electric motor and the IC engine, a determination will be made of the torque level of the motor. Another determination will be made of the accelerator travel position. A predefined percentage of a maximum IC engine torsional output will be fixed to a predefined accelerator pedal travel second position. Typically, the predefined percentage of maximum engine torsional output will be 100% and the predefined accelerator pedal travel second position will be between 75 and 85% and is commonly placed at the 80% position. The accelerator pedal travel second position is often referred to as a tip in value of the accelerator pedal. The vehicle controller will scale the accelerator travel by a predefined functional relationship from the accelerator pedal travel first position to the accelerator pedal travel second position. In most instances, the predefined functional relationship will be linear. Accordingly, and in most instances, the accelerator pedal travel will be scaled such that at 80% of travel, maximum engine torque will be demanded via the accelerator pedal. Torque demand beyond the 80%, sometimes referred to as boost torque position, flooring the pedal or wide open throttling position of the accelerator pedal, will cause the electric motor to additionally provide torque to the drive axle typically in a preferred linear manner.

It is an advantage of the present invention to provide a HEV which distributes torque to an IC engine and electric motor in a manner which causes operation of the vehicle to be similar to that of a conventional IC engine powered vehicle by use of an accelerator pedal.

Other advantages of the invention will become more apparent to those skilled in the art upon a reading of the following detailed description and upon reference to the drawings.

BRIEF DESCRIPTION OF DRAWINGS

FIGS. 11A–J through 15A–J, 16A–F, and 17A–J are graphic displays of the functional response of the hybrid electric vehicle which is controlled by the algorithm shown in FIGS. 1–9 which give graphic displays of vehicle velocity (A), throttle angle (B), engine RPM (C), transmission gear ratio (D), torque output at the half shafts (E), engine torque (F), motor torque (G), percentage of accelerator pedal travel (H), velocity error (I) and engine clutch engagement (J).

DETAILED DESCRIPTION

Figure 10:
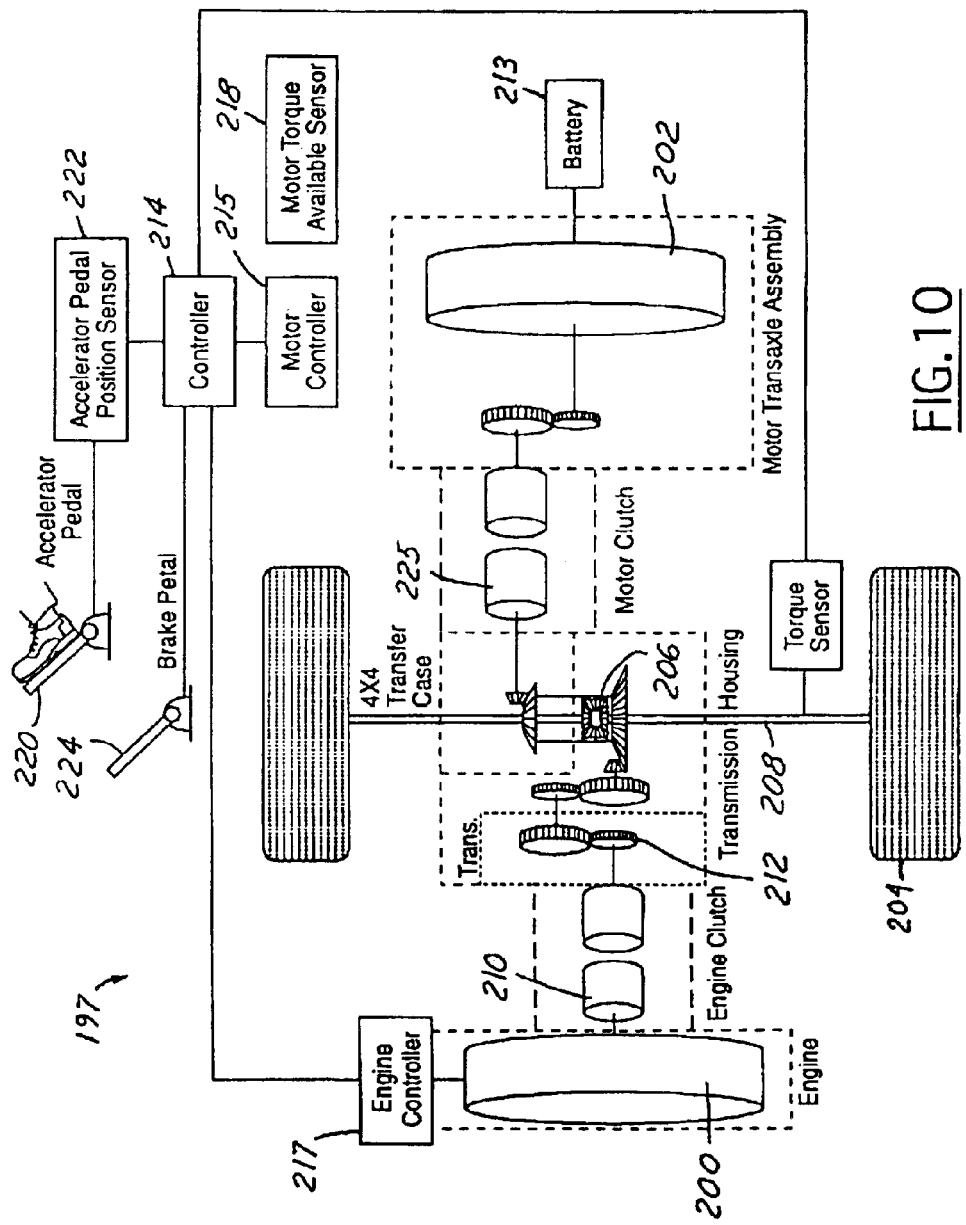
FIG. 10 is a view of a post-transmission hybrid electric vehicle power train utilized in the algorithm described in FIGS. 1–9.
Figure 11F:
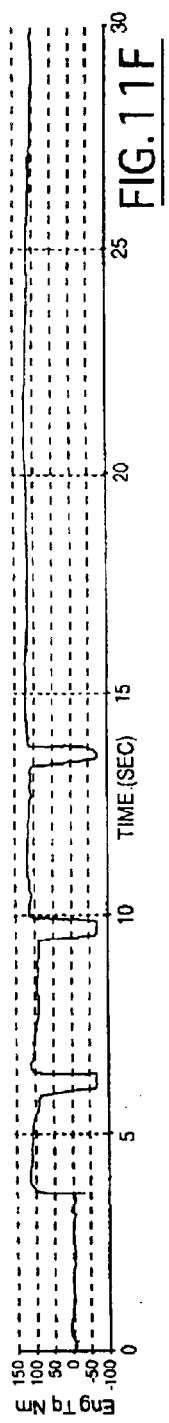
Figure 11G:
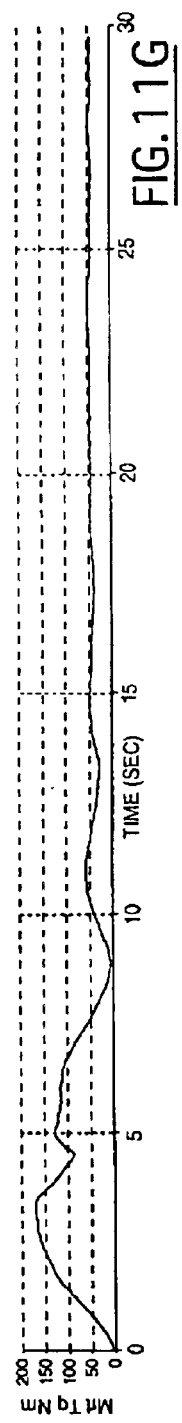
Figure 11H:
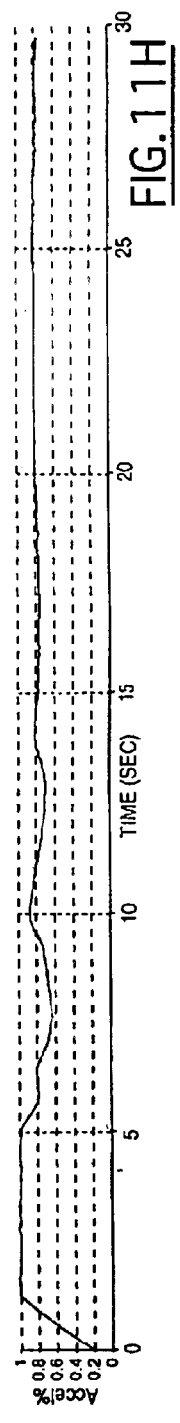
Figure 11I:
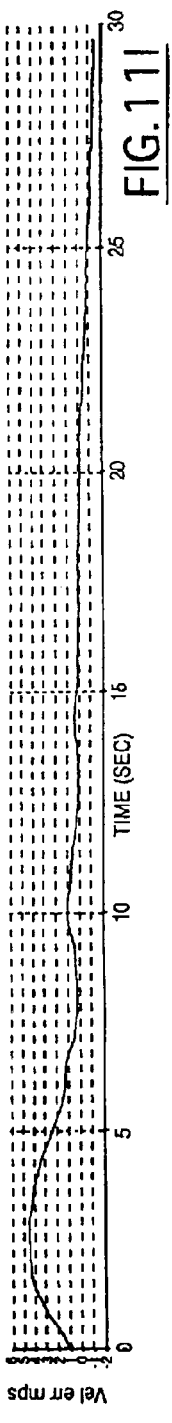
Figure 11J:
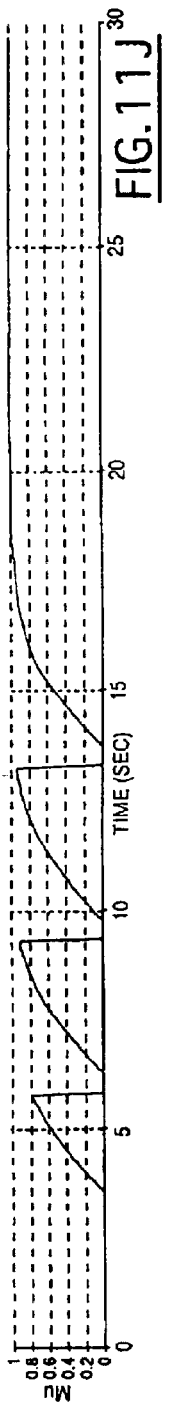
Figure 13A:
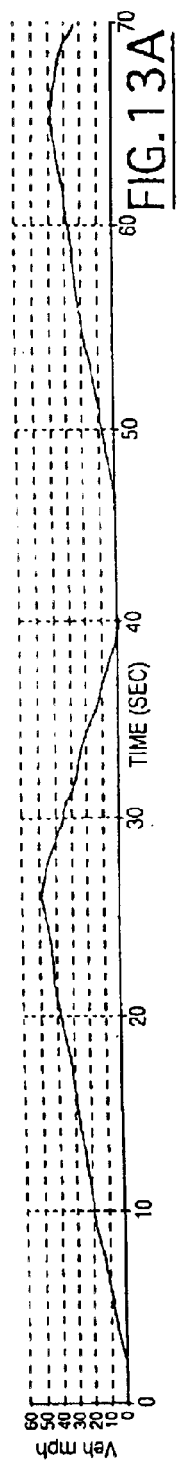
Figure 13B:
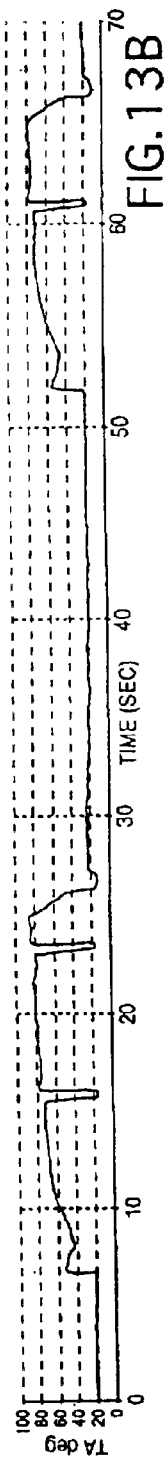
Figure 13C:
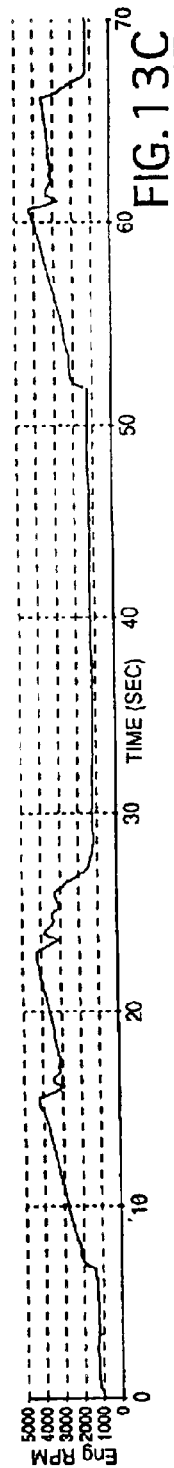
Figure 13D:
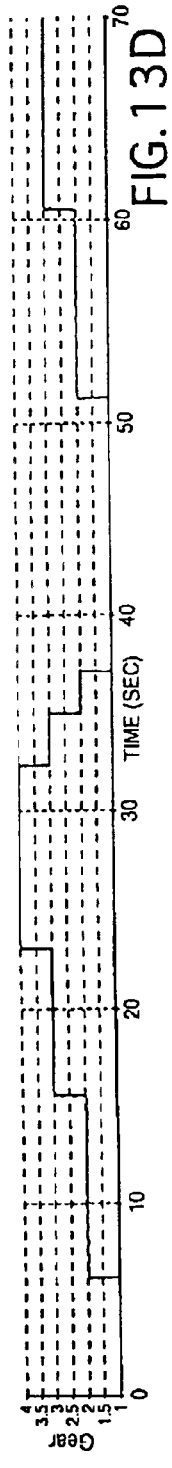
Figure 13E:
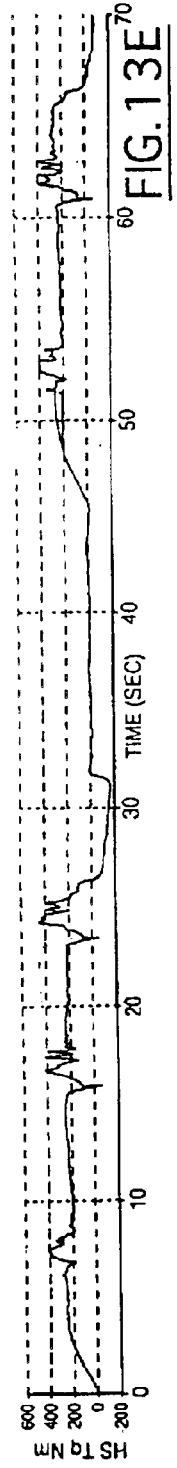
Figure 14F:
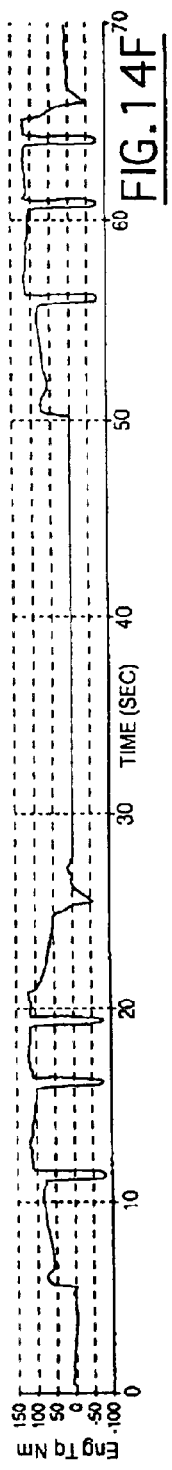
Figure 14G:
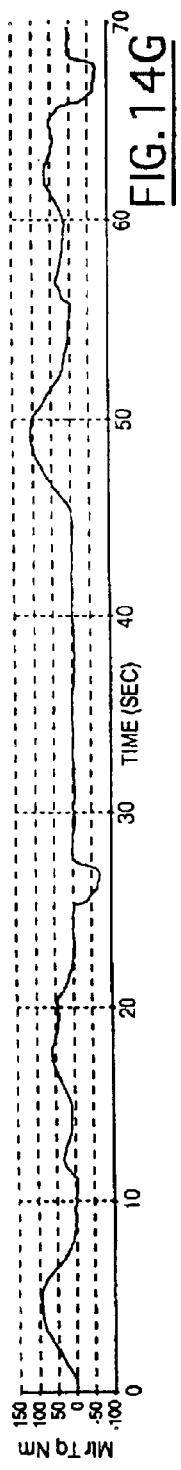
Figure 14H:
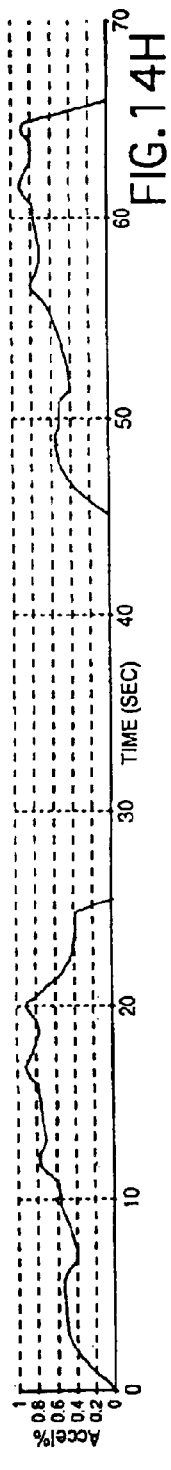
Figure 14I:
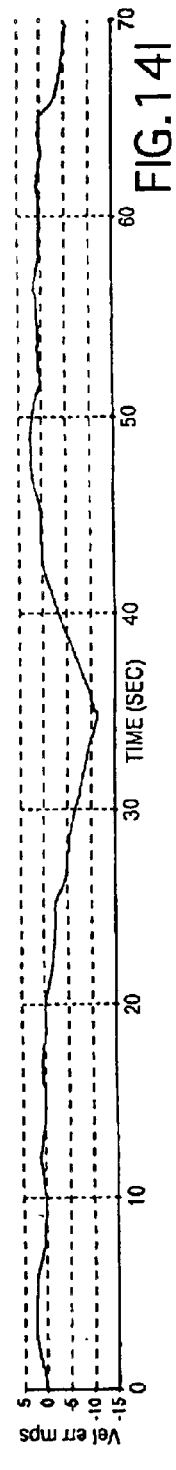
Figure 14J:
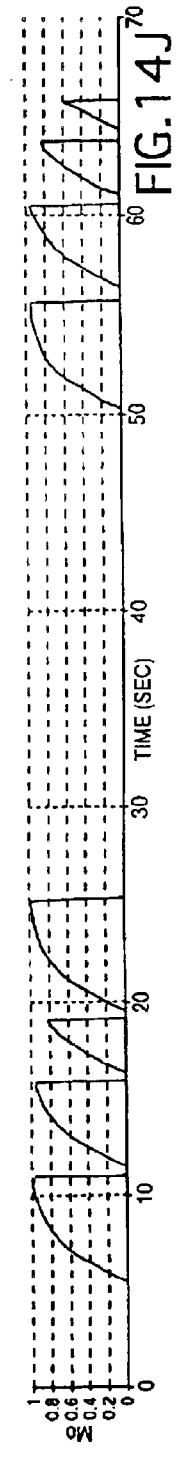
Figure 17F:
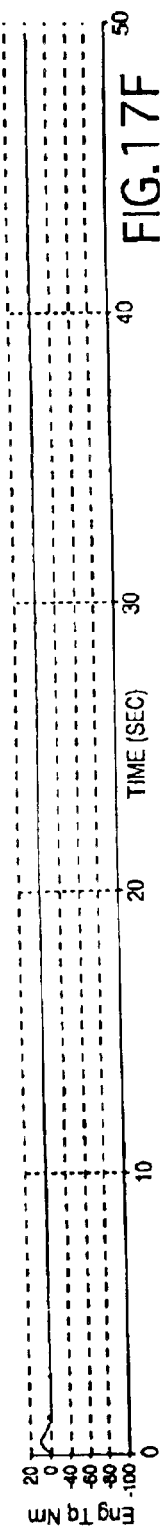
Figure 17G:
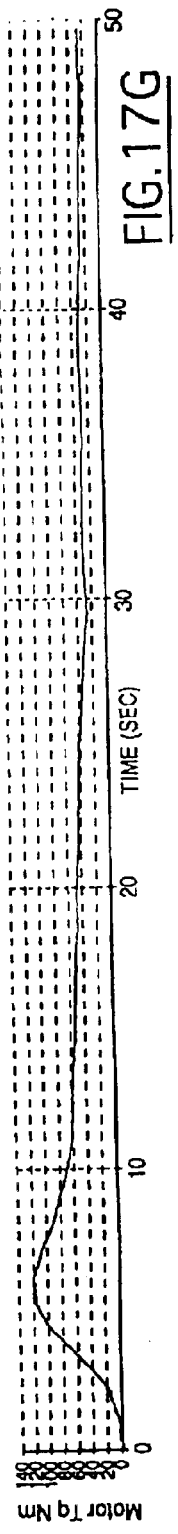
Figure 17H:
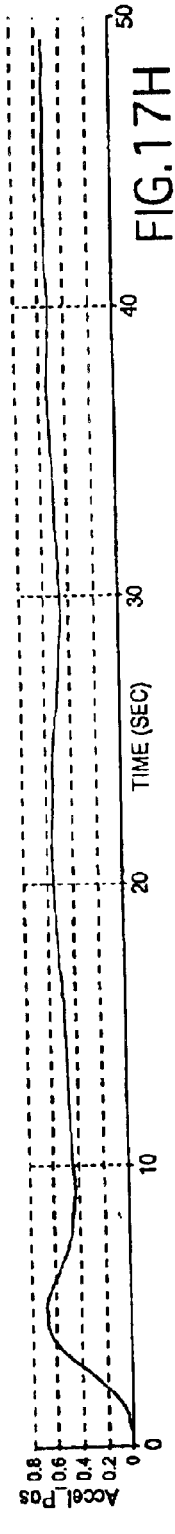
Figure 17I:
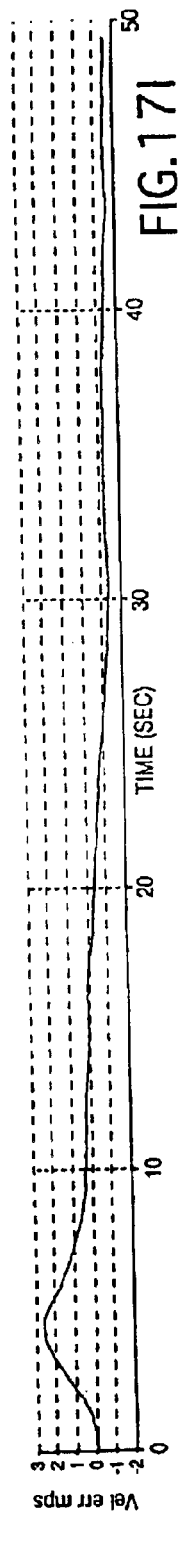
Figure 17J:
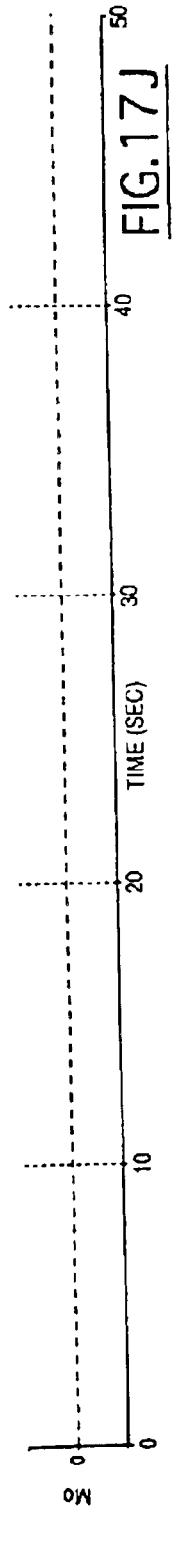

FIG. 10 is a diagram of a post-transmission PHEV configuration. A powertrain driveline 197 includes rotational dynamics for a PHEV, which accepts IC engine 202 and motor torque (in a regenerative or motoring mode), and delivers torque to drive wheels 204 through a differential 206 and halfshafts 208. Motor torque is delivered via a transaxle to the differential 206 through a 4×4 coupler connected to a halfshaft 208, and summed with engine torque at the differential 206. The engine 200 is connected directly to the differential 206 through the engine clutch 210, transmission and final drive, as in a conventional powertrain. Included in the driveline 197 is a layshaft transmission 212 that lies between the engine clutch 210 and the differential 206.

A PHEV coordinated controller 214 provides motoring and regenerative commands to a motor controller 215 for corresponding positive and negative motor 202 torque, and throttle blade commands to an engine controller 217. These commands may be based on the battery SOC, motor speed versus torque limits, motor 202 torque current, motor 202 field current, transmission 212 gear, accelerator pedal 220 position, engine clutch 210 state, motor clutch 225 state, engine 200 speed, average power at the drive wheels 204, shift status, estimated engine 200 torque, and estimated motor 202 torque available. In addition, the controller 214 provides engine and motor clutch 210, 225 control during braking, or hybrid operation. The controller distributes braking commands to a regenerative brake system associated with the motor 202 and a friction brake system (not shown).

The torque may be partitioned to operate in an engine 200 only mode, a motor 202 only mode, or a two traction device mode (hybrid mode). Hybrid mode operation consists of motor 202 only operation, engine 200 operation, motor 202 torque application during shifting, motor 202 assist during power boost, and regenerative braking. The motor 202 can provide torque during shifting so that torque disruption to the driveline 197 is eliminated. The drive line 197 will provide negative torque via the motor 202 during braking for energy recovery to a battery 213. During periods of low storage device (SOC) battery 213 operation, the engine 200 may be loaded with the alternator (not shown) to increase the storage device operation. The vehicle driveline 197 has a torque sensor 216. Torque sensor 216 may be a single torque sensor or a plurality of torque sensors which may sense the torque at the halfshafts 208 and by computation determine the torque of the engine 200 or of the motor 202 or may be a combination of sensors appropriately placed. The controller 214 is also connected with a motor torque available sensor 218 to apprise the controller 214 on the amount of maximum motor torque available which is typically highly dependent upon battery SOC. To receive operator drive commands for torque there is an accelerator pedal 220. The accelerator pedal 220 is operatively associated with an accelerator pedal position sensor 222. The accelerator pedal position sensor 222 is also communicative with the controller 214. The motor 202 also has between itself and the differential 206 a clutch 225 which for the purposes of this invention can be considered essentially in a closed or engaged position. The vehicle also has a brake pedal 224 which communicates with the controller 214.

The vehicle launches in motor 202 only mode for optimal drivability, emissions, and fuel economy. When the average power at the vehicle drive wheels 204 reaches a level where operation of the engine 200 is beneficial, the motor 202 is no longer operated alone.

Overview.

This section contains a high level description with a detailed description in the next section. The Torque Split 1 control algorithm determines the magnitudes of the motor 202 torque command and the engine 200 torque command. This algorithm also determines the accelerator pedal 220 command from the driver and determines the torque partitioning between the traction devices (engine 200, motor 202). FIGS. 1–8 are block diagrams depicting the control algorithm. These diagrams were used to generate autocode (C code), which actually ran in the prototype vehicle.

Figure 1:
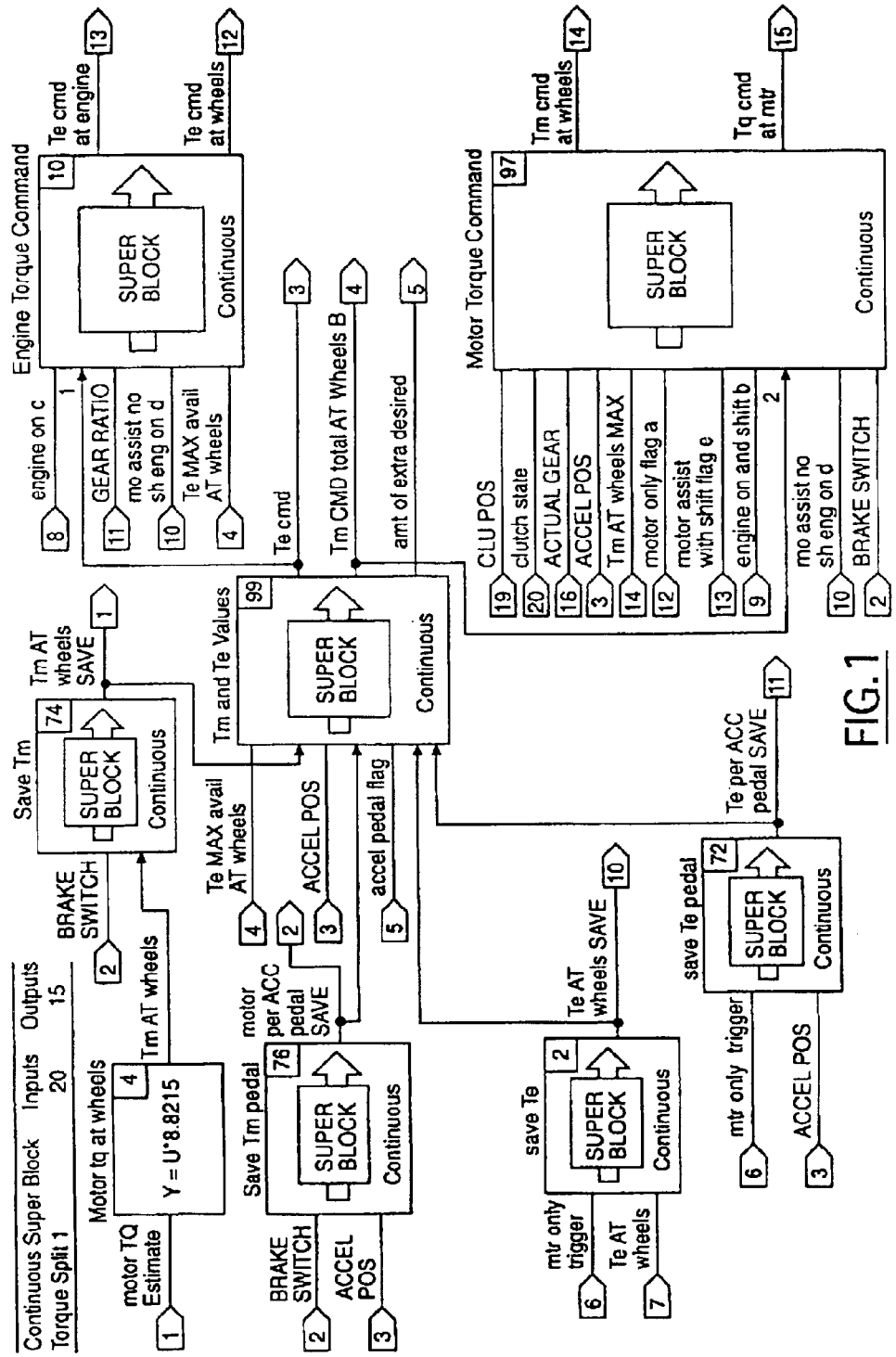
FIGS. 1–9 are block diagrams of the torque distribution algorithm utilizing a preferred embodiment hybrid electric vehicle according to the present invention

FIG. 1: Block Diagram of Torque Distribution Algorithm.

This algorithm contains seventeen inputs as labeled in FIG. 1:

Motor202TQEstimate (Nm): estimated motor 202 torque.

BRAKE SWITCH (logic): when 1, a brake pedal 224 is depressed

ACCEL POS: accelerator pedal travel position in per unit values (0—no pedal command to 1—wide open throttle (WOT))

TeMAXavailATwheels 204 (Nm): Maximum Engine 200 Torque Available at the Wheels 204 accel pedal flag (logic): when 1, the accelerator pedal 220 is depressed mtr only trigger (logic): motor 202 only trigger=1, only the motor 202 is operating, no engine 200 operation TeATwheels 204 (Nm): Engine 200 Torque at the Wheels 204 engine 200 on c (logic): when 1, the engine 200 is operating with or without the motor 202 engine 200 on and shift b (logic): when 1, the engine 200 is operating without motor 202 boost prior to the shift mo assist no sh eng on d (logic): when 1, the motor 202 is boosting and the vehicle is not shifting

GEAR RATIO motor 202 only flag a (logic): when 1, the motor 202 is operating without the engine 200 motor 202 assist with shift flag e (logic): when 1, the motor 202 is boosting prior to a shift TmATwheels 204MAX (Nm): Maximum Motor 202 Torque Available at the Wheels 204

ACTUAL GEAR: R,N, 1,2,3,4,5

CLU POS: clutch 210 position logic, when 1, the engine clutch 210 is asked to engage clutch 210 state (logic): when 1, the engine clutch 210 is engaged This algorithm contains two outputs as labeled in FIG. 1:

Te cmd at engine 200 (Nm): torque command at the engine 200

Tq cmd at motor 202 (Nm): torque command at the motor 202

Figure 2:
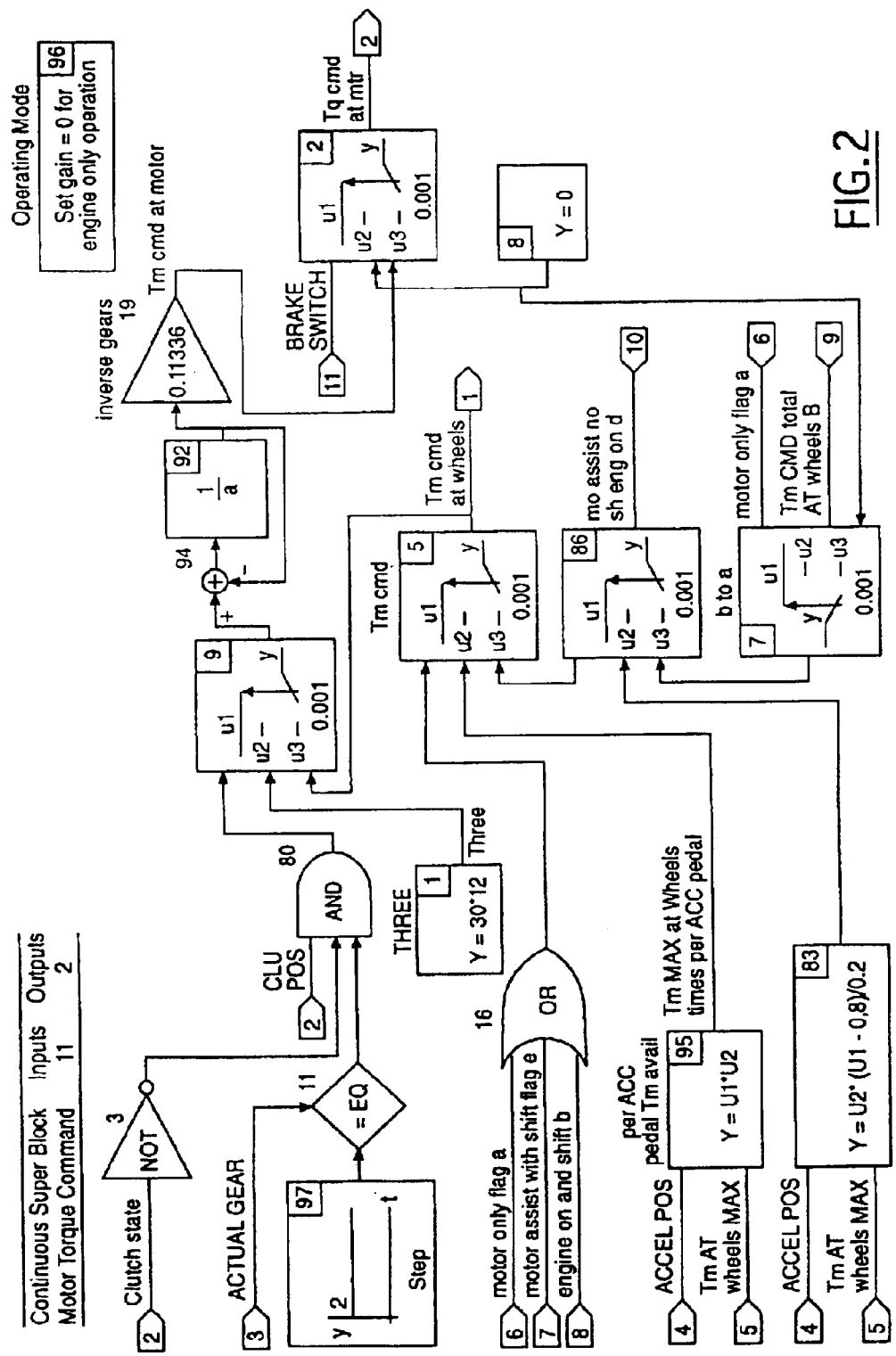

When the vehicle is launched in motor 202 only mode, depicted in FIG. 2, the amount of motor 202 torque commanded is a linear function based on the maximum motor 202 torque available at any instant, TmATwheels204MAX, and the percentage of accelerator pedal 220, ACCEL POS, depressed. This is labeled as perACCpedal Tmavail, block 95, in FIG. 2. If the accelerator pedal 220 is depressed 100%, then 100% of the maximum motor 202 torque available is commanded. If the accelerator pedal 220 is depressed 50% then the motor 202 torque commanded is 50% of the maximum motor 202 torque available. Since the battery 213 SOC can change drastically from the beginning of a journey to the end of a journey, the accelerator pedal 220 is scaled in this manner so that the driver always can be assured of receiving more motor 202 torque for increased pedal depression. The amount of motor 202 torque available is heavily dependent on the battery 213 SOC. When the driver depresses the accelerator pedal 220 50%, the driver knows 50% more torque is available if needed. If the driver depresses the accelerator pedal 220 100% and the vehicle does not accelerate as desired due to low battery 203 SOC the driver knows to drive cautiously.

This vehicle is capable of operating in a motor 202 only, engine 200 only or hybrid mode. This mode is selected by the driver through a switch on the driver control panel. Any mode that the driver chooses to operate the vehicle is transparent. The pedal interface between the driver and the vehicle is invisible to the driver.

When the vehicle is operated in the hybrid mode and the vehicle transitions from motor 202 only mode to engine 200 on mode, the torque commanded by the driver at this transition is commanded initially to the motor 202. If the driver's accelerator pedal 220 command did not change but the hybrid controller wishes to command torque to the engine 200 instead of the motor 202 the driver will not be aware of this transition.

Figure 3:
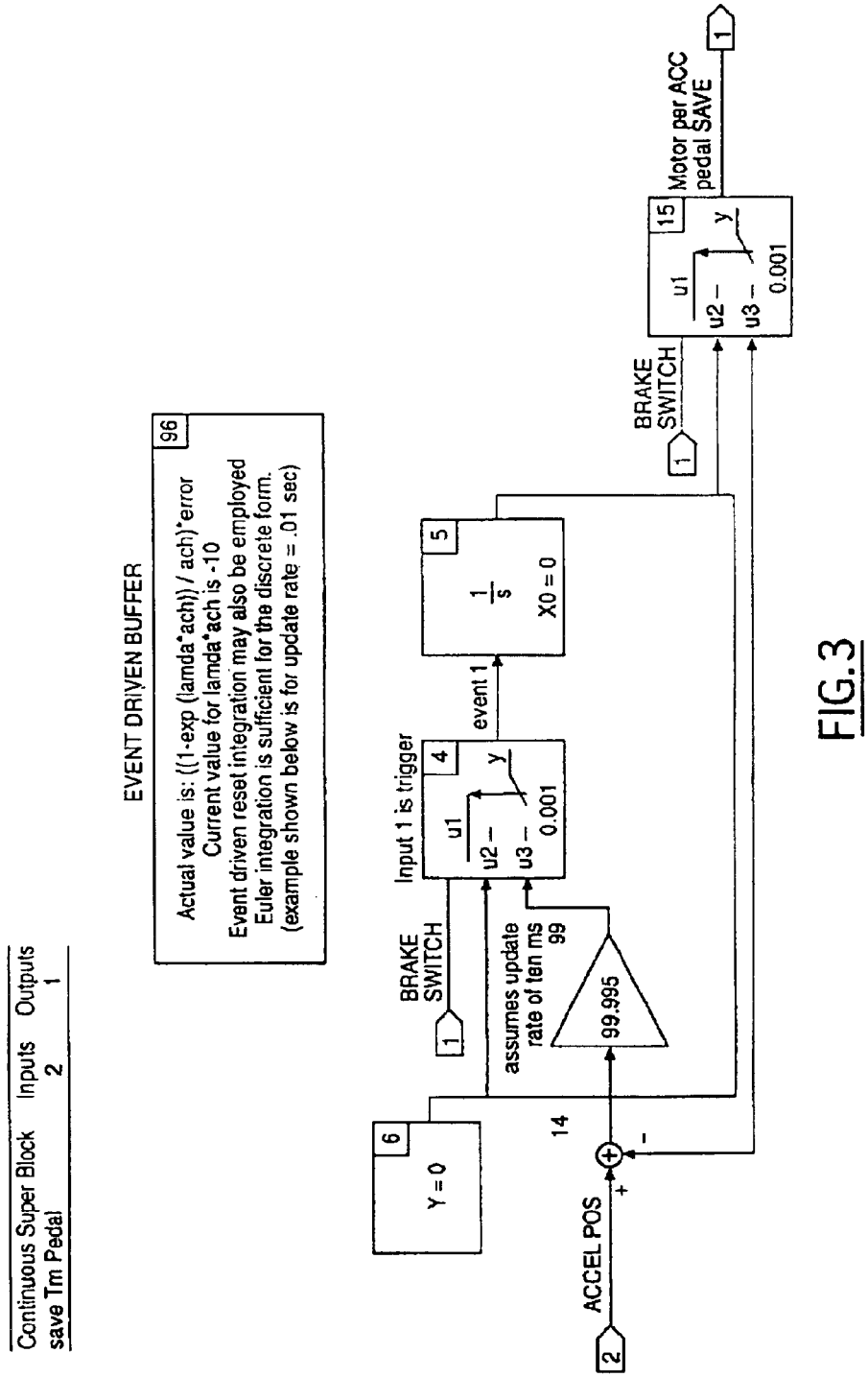
Figure 4:
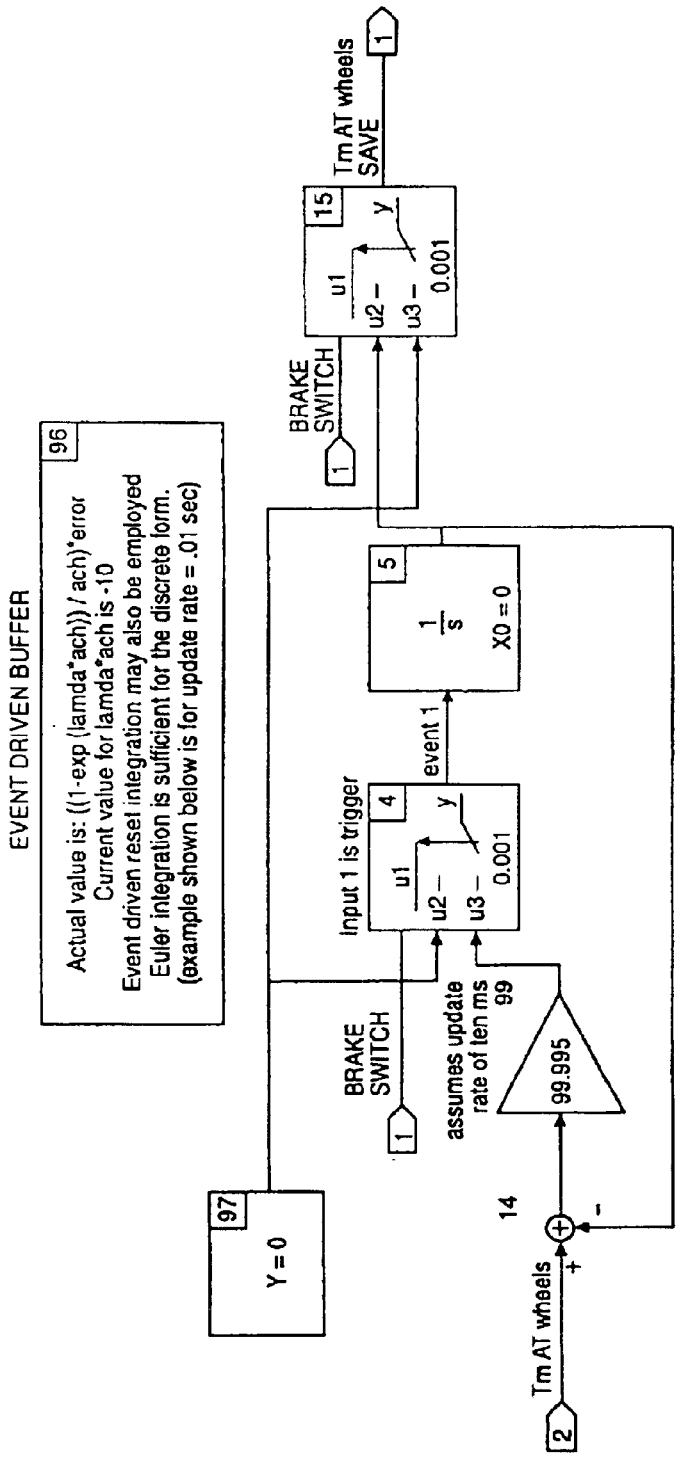
Figure 5:
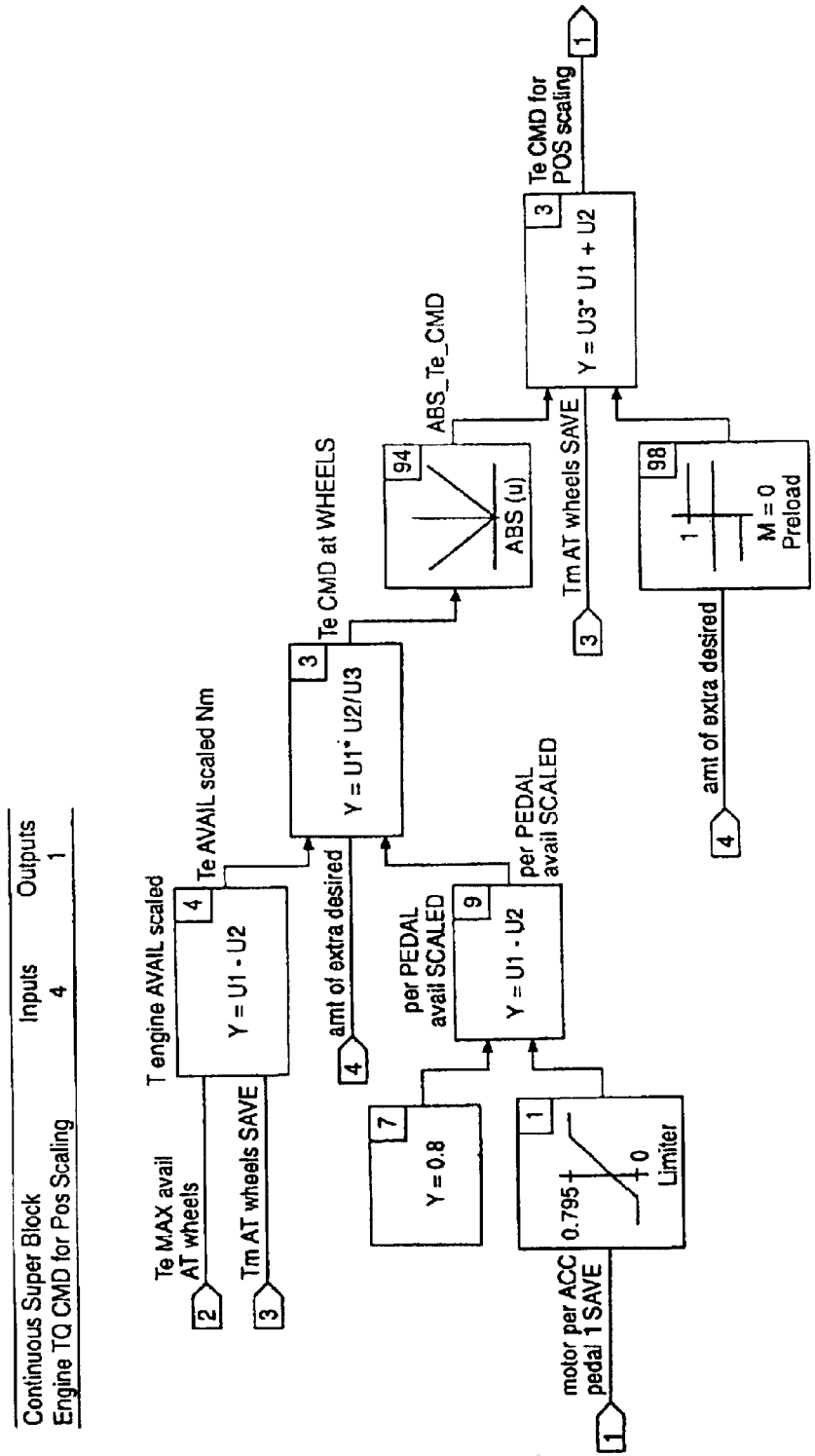

When the vehicle transitions from motor 202 only to engine 200 on operation the motor 202 torque commanded must be saved at the exact accelerator pedal 220 position command from the driver during the transition, shown in FIGS. 3 and 4. This saved motor 202 torque command, TmATwheels204SAVE, and pedal travel (first position), motor202perACCpedalSAVE, is then used to scale the accelerator pedal's torque output per pedal angular movement. A predefined fixed percentage of pedal travel is selected as a second pedal position (second position). Preferably the percentage of pedal travel selected as the second position will be 75–85%. 80% pedal travel has been found to be a preferable pedal travel second position in many instances. A first predefined percentage of a maximum of engine 200 torque available at the wheels 204 corresponds to 80% accelerator pedal 220 travel (second position). The first predefined percentage of maximum engine 200 torque available will typically be between 95 and 100%. 100% has been found to be preferable in most instances. The difference between 80% of pedal travel (second position) and the saved percentage of pedal travel first position is used as endpoints. A first predefined function relationship, which is typically linear is used to scale the accelerator pedal 220 with the maximum engine 200 torque being at the accelerator pedal 220 second position. This is depicted in FIG. 5.

At 80% of accelerator pedal 220 travel, the maximum engine 200 torque available is commanded. The remaining 20% of pedal travel is scaled as a second predefined function, typically linear with a second predefined percentage of maximum motor 202 torque available (typically 100%) to provide boost. At 80% accelerator pedal 220 travel no motor 202 torque is commanded, and at 100% accelerator pedal 220 travel the second predefined percentage maximum motor 202 torque available is commanded.

Figure 6:
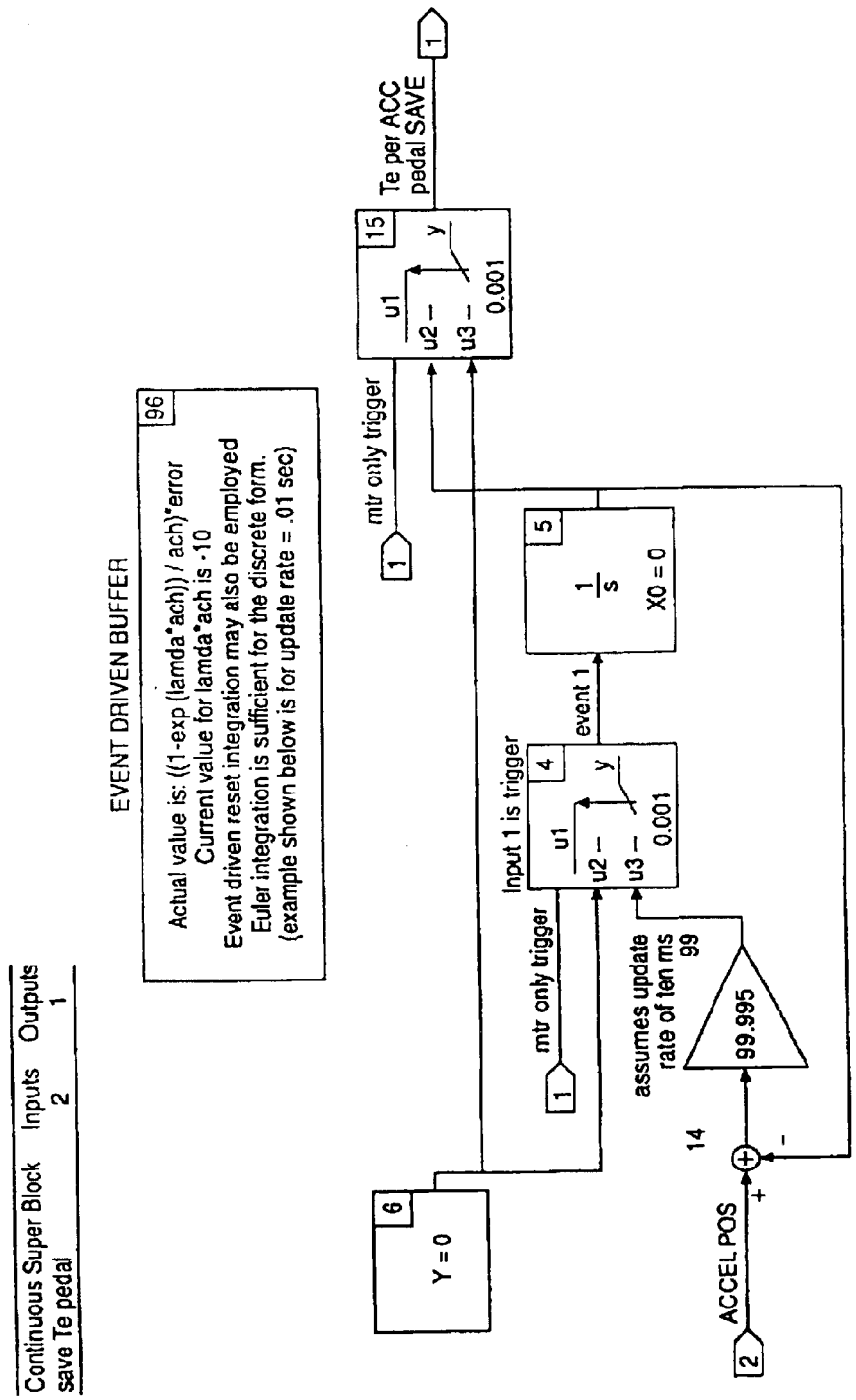
Figure 7:
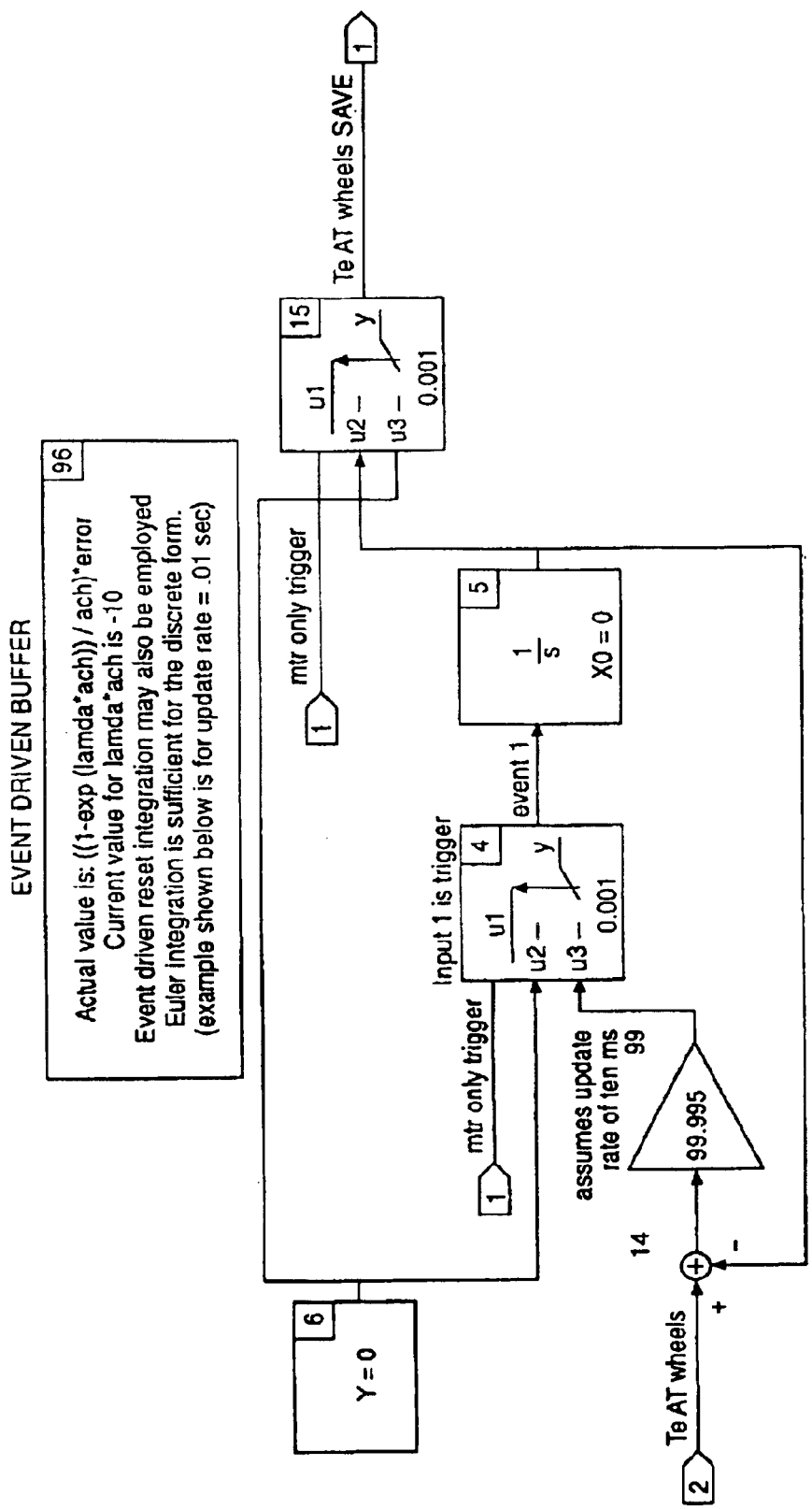

As the vehicle transitions from engine 200 operation back to motor 202 only operation, the engine 200 torque commanded at the transition and the non-fixed accelerator pedal 220 travel position (third position) at the transition are saved. These saved values are used to scale the motor 202 torque command in a third predefined functional relationship (usually linear) between the accelerator pedal 220 third position and a third predefined percentage of pedal travel position (typically 0–5%). This is shown in FIGS. 6 and 7.

Motor 202 Torque Command.

The vehicle launches in motor 202 only mode. The amount of motor 202 torque commanded, Tq cmd at mtr, is described in FIG. 2. The following explains the motor 202 torque command algorithm. The motor 202 torque commanded at the motor 202 is that motor 202 torque commanded at the wheels 204 divided by the 4×4 and transaxle gear ratios, block 19, and filtered with a low pass filter, blocks 92 and 94. If the brake switch, activated by brake pedal 224, is high the torque command at the motor 202, Tq cmd at mtr, is zero in this part of the algorithm, blocks 2 and 8. If the engine 200 clutch 210 is being commanded to engage (CLU POS=1) and the clutch 210 is open (clutch 210 state=0) and the transmission is in second gear blocks 80, 3, 11, 97, then the motor 202 torque commanded at the wheels 204 is 30 Nm*4×4 and transaxle gear ratios, block 1.

If the motor 202 only flag a, or the motor 202 assist with shift flag e or the engine 200 on and shift b flags are high, blocks 16 and 5, then the motor 202 torque commanded at the wheels 204, Tm cmd at wheels 204, is the acceleration position, ACCEL POS, multiplied by the maximum motor 202 torque at the wheels 204, TmATwheels204MAX, block 95. Else if the motor 202 assist with no shift d is high, block 86, then the motor 202 torque commanded at the wheels 204 is the difference between the present accelerator pedal 220 position, ACCEL POS, and 80% of the pedal travel multiplied by the maximum motor 202 torque available at the wheels 204, TmATwheels204MAX, divided by 20% of the pedal travel, block 83.

Figure 8:
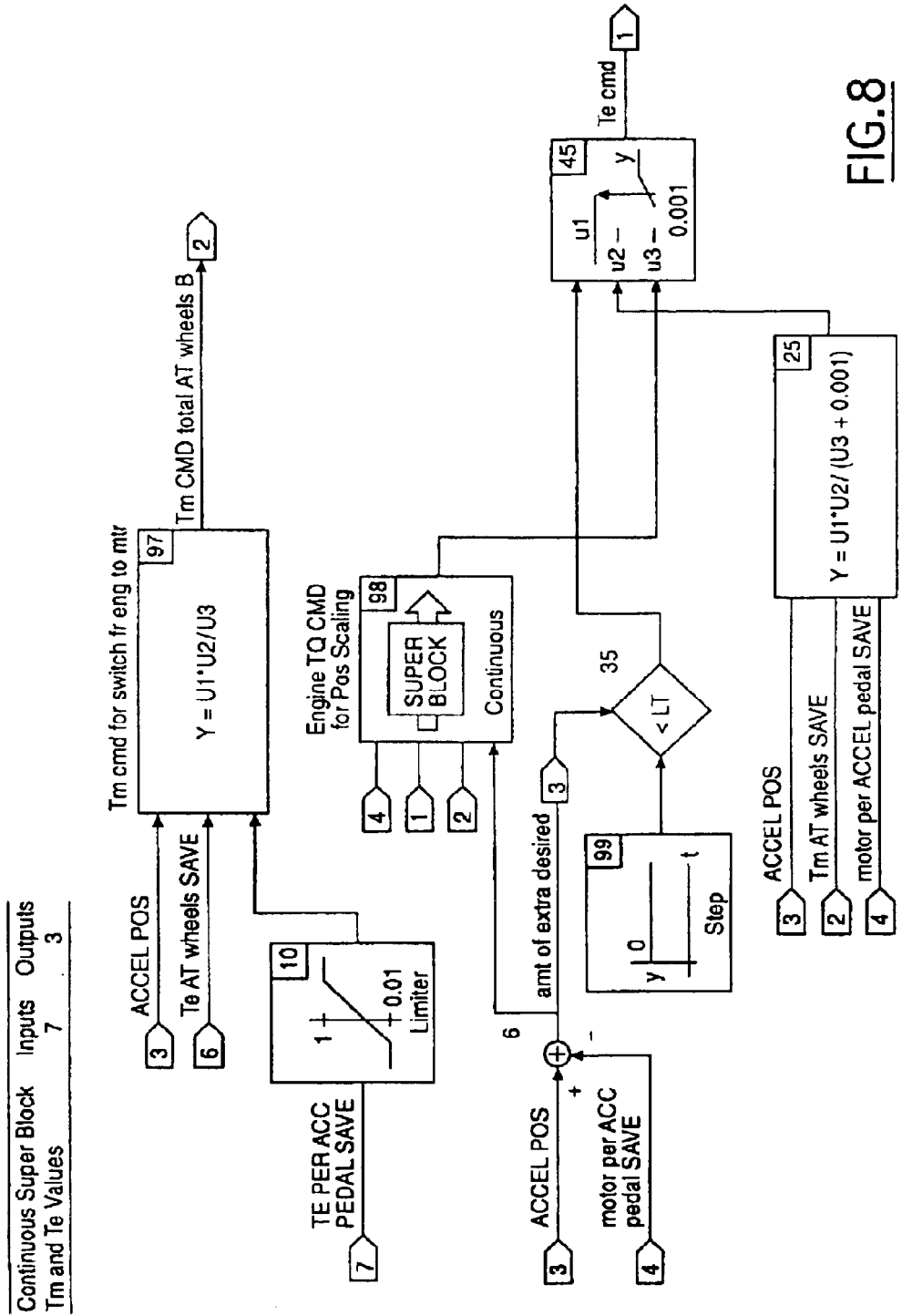

Else if the motor 202 only flag a is high after previously being in a state where motor 202 only flag a, or motor 202 assist with shift flag e, or engine 200 on and shift flag b, or motor 202 assist with no shift flag d, block 7, was high then the motor 202 torque command at wheels 204 is the acceleration position, ACCEL POS, multiplied by the engine 200 torque at the wheels 204 saved, TeATwheels204SAVE, divided by the engine 200 torque percent accelerator pedal 220 saved, TeperACCpedalSAVE. This is shown in FIG. 8, blocks 10 and 97.

Motor 202 to Engine 200 Transition Saved Torque and Pedal Values.

As depicted in FIGS. 3 and 4, when the BRAKE SWITCH is high, the accelerator position ACCEL POS is continuously being updated and the motor202perACCpedalSAVE is zero. When the BRAKE SWITCH goes low the ACCEL POS accelerator position is no longer updated and the present value is saved as motor202perACCpedalSAVE. Similarly, TmATwheels204SAVE is saved. When the BRAKE SWITCH is low then motor202perACCpedalSAVE is zero. When the BRAKE SWITCH goes high, then the accelerator position is saved as motor202perACCpedalSAVE and the motor 202 torque is saved as TmATwheels204SAVE.

Engine to Motor Transition Saved Torque and Pedal Values.

As depicted in FIGS. 6 and 7, when the mtr only trigger is high the accelerator position ACCEL POS is continuously being updated and the TeperACCpedalSAVE is zero. When the mtr only trigger goes low the ACCEL POS accelerator position is no longer updated and the present value is saved as TeperACCpedalSAVE. Similarly, TeATwheels204SAVE is saved. When the mtr only trigger is low then TeperACCpedalSAVE is zero. When the mtr only trigger goes high, then the accelerator position is saved as TeperACCpedalSAVE and the engine 200 torque is saved as TeATwheels204SAVE.

Engine 200 Torque Command.

As described in FIG. 8, when the vehicle is not in a motor 202 only mode, the engine 200 torque command, Te cmd, is derived by subtracting the percent of motor 202 only accelerator pedal 220 saved, motor202perACCpedalSAVE, from the present accelerator pedal 220, ACCEL POS, value. This difference is the amount of extra pedal desired, amt of extra desired, from the driver. The amount of extra desired is that above and beyond what was previously being commanded during motor 202 only.

During the transition from motor 202 to engine 200 on, as shown in FIG. 5, the difference between the maximum engine 200 torque available at the wheels 204, TeMAXavailATwheels204, and the motor 202 torque saved, TmATwheels204SAVE, at the wheels 204 gives the engine 200 torque available for scaling, TeAVAILscaled Nm, block 4. The difference between the 80% tip in value and the percent motor 202 accelerator pedal 220 saved, motor202perACCpedalSAVE, determines the available percentage of the pedal for scaling, block 1,7,9. The engine 200 torque available, TeAVAILscaled Nm, multiplied with the amount of extra accelerator pedal 220 desired divided by the percent of accelerator pedal 220 scaled, perPEDALavailSCALED, gives the engine 200 torque commanded referred to the wheels 204, TeCMDatWHEELS204, block 3. The absolute value of the engine 200 torque commanded at the wheels 204 is taken, ABS_Te_CMD, and multiplied by the sign of the amount of extra accelerator pedal 220 desired, amt of extra desired. The motor 202 torque saved at the wheels 204TmATwheels204SAVE, is then added to the signed engine 200 torque command, ABS_Te_CMD, when the accelerator pedal 220 is depressed to get TeCMD for POS scaling, blocks 94, 98, and 99.

In FIG. 8, when the amount of extra (torque) desired is negative, block 35, the accelerator position, ACCEL POS, is less than the torque motor 202 per accelerator pedal 220 saved, motor202perACCpedalSAVE. When this occurs, the present accelerator position, ACCEL POS, is multiplied by the motor 202 torque saved at the wheels 204, TmATwheels204SAVE, and divided by the percent motor 202 accelerator pedal 220 saved, motor202perACCpedalSAVE, block 25. This then is the engine 200 torque command, Te cmd, else the previous engine 200 torque command, TeCMD for POSscaling, is used, block 45.

Figure 9:
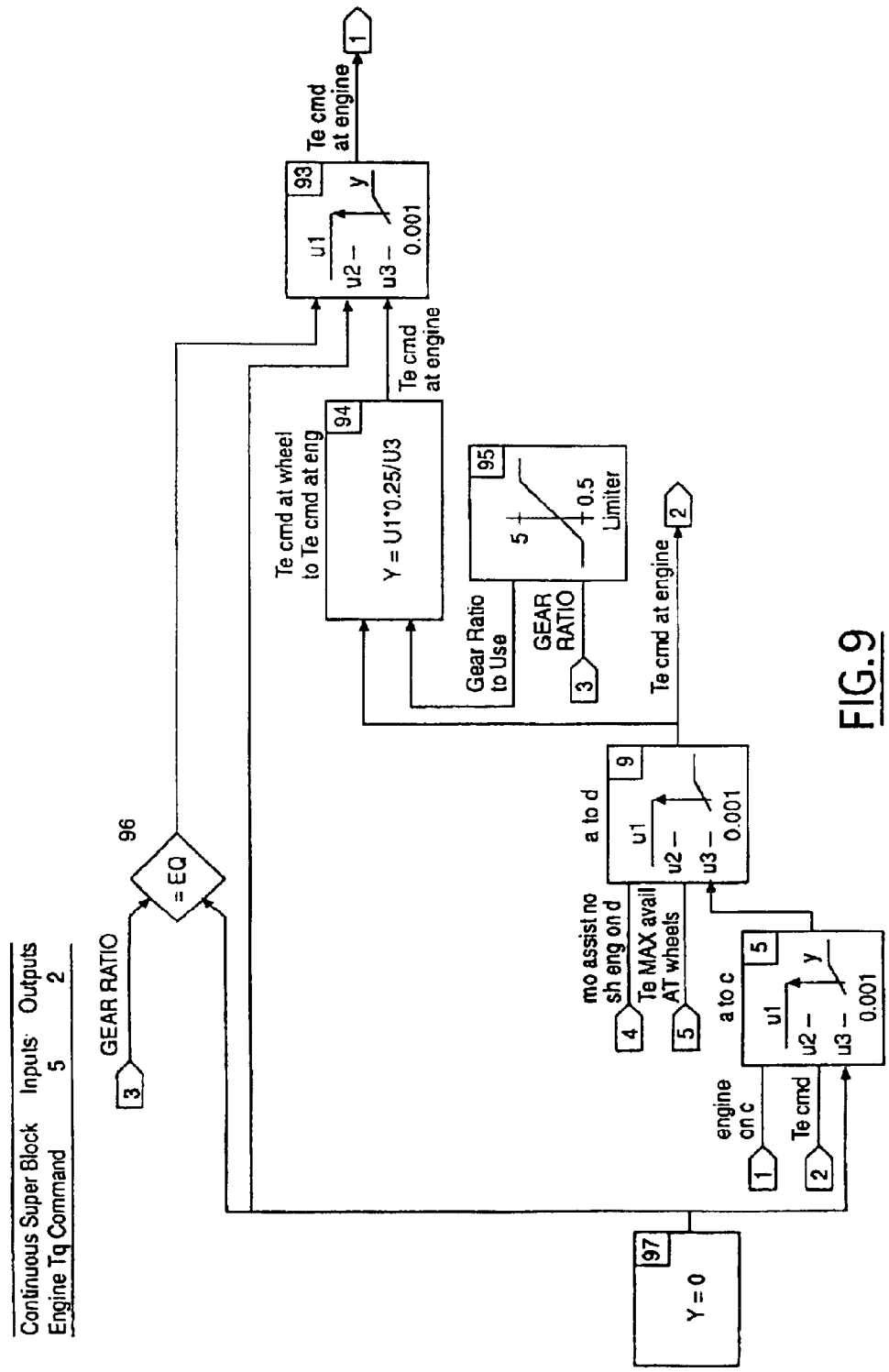

Viewing FIG. 9, if the transmission is in neutral, then the engine 200 torque command is zero, blocks 93, 96, and 97. The engine 200 torque command at the engine 200 becomes the engine 200 torque commanded at the wheels 204 divided by the gear ratio and the final drive, blocks 9 and 94. If a motor 202 assist non shifting mode, block 9, is desired then the maximum engine 200 torque available at the wheels 204 is commanded, TeMAXavailATwheels204. This occurs when the accelerator pedal 220 position is greater than 80%. If the engine 200 is on without shifting then, Te cmd is the engine 200 torque command, Te cmd, at engine 200.

A post-transmission PHEV was built and test data was taken. The vehicle was driven in engine 200 only mode, motor 202 only mode and hybrid mode, while test data was taken.

The following figures show simulations of medium acceleration hybrid operation; low acceleration/deceleration profile repeated on a 10% grade hybrid operation; low acceleration/deceleration profile repeated in hybrid operation; medium acceleration/deceleration profile repeated in hybrid operation; WOT acceleration/deceleration profile repeated in hybrid operation. The figures also show medium acceleration engine 200 only and low acceleration motor 202 only simulations.

The hybrid mode simulations show strip charts of vehicle velocity in mph, throttle angle in degrees, engine 200 speed in rpm, gear number, halfshaft torque in Nm, engine 200 torque in Nm, motor 202 torque in Nm, accelerator position in per unit, velocity error between the command and vehicle in mps, and clutch 210 position in per unit. The engine 200 only and motor 202 only simulations show strip charts of vehicle velocity in mph, throttle angle in degrees, engine 200 speed in rpm, gear number, halfshaft torque in Nm, and engine 200 torque in Nm.

Medium Acceleration Hybrid Operation.

The first plot, FIG. 11, shows a medium acceleration hybrid operation. The vehicle launches in motor 202 only mode. From zero seconds until 2.5 seconds the vehicle begins to accelerate, the throttle angle is at idle, the engine 200 speed is at idle speed, the vehicle is in first gear, the halfshaft torque begins increasing, the engine 200 torque is zero, the motor 202 torque is increasing, the accelerator position is increasing from 20% to maximum, the velocity error is increasing and the clutch 210 is disengaged. From about 2.5 seconds until about 6 seconds the vehicle is in second gear.

During second gear operation the vehicle continues to accelerate, the throttle angle increases from idle during the gear shift (as seen in the first second of second gear) to full throttle; the engine 200 speed increases from idle speed to 5000 rpm; the halfshaft torque remains constant during the first second in second gear, due to torque fill in from the motor 202 during the gear shift, the halfshaft torque then increases due to the engine 200 torque being added to the motor 202 torque; the engine 200 torque starts at idle during the gear shift, and then ramps to 100 Nm of torque; the motor 202 torque provides fill in torque at the beginning of the shift, and is then ramped to an appropriate boost value to aid the engine 200 during the driver WOT command; the velocity error decreases as the engine 200 assists the motor 202 in second gear; the clutch 210 is beginning to engage.

The shift from second to third gear occurs at about seven seconds. During the gear shift the vehicle continues to accelerate due to the motor 202 torque fill in; the throttle angle is ramped to idle; the engine 200 speed is ramped to idle, but does not make it to idle before clutch 210 engagement occurs; gear three is selected; the halfshaft retains torque due to the motor 202 torque fill in during a shift; the vehicle velocity error continues to decrease; the clutch 210 is disengaged. From seven until nine seconds gear three is exercised. During gear three the motor 202 torque can be seen decreasing due to the driver accelerator command falling below 80%, that is it exits the boost mode. The vehicle velocity error is almost zero. The vehicle shifts to fourth and fifth gear in the same manner.

Repeated Low Acceleration/Deceleration on a 10% Grade Hybrid Operation.

The vehicle launches in the same manner during this mode of operation. In FIG. 12, during second gear the motor 202 does not assist the engine 200 due to a less than 80% driver accelerator command. During third gear motor 202 assistance is necessary due to the driver commanding more than 80% throttle. During fourth gear the driver continues to accelerate the vehicle, then begins to brake the vehicle.

During vehicle braking the vehicle decelerates; the throttle angle is commanded to idle; the engine 200 speed is driven to idle; the vehicle remains in fourth gear; the halfshaft torque becomes negative; the motor 202 is operated as a generator and performs regenerative braking supplying negative torque to the drive wheels 204; the accelerator position is zero; the vehicle velocity error becomes negative; the clutch 210 disengages. As the vehicle decelerates the transmission down shifts. The vehicle comes to zero speed. The engine 200 remains at idle. Gear one is obtained. The halfshaft torque and motor 202 torque become zero, and the clutch 210 remains open. The driver commands acceleration at about 35 sec. The vehicle launches with motor 202 only until gear two. The previously described behavior continues.

FIG. 13 shows that vehicle launch occurs in first gear using the traction motor 202. During second gear, occurring at approximately seven seconds, the throttle angle increases from idle to about 70 degrees; the engine 200 speed ramps from idle to about 4000 rpm; the engine 200 torque increases from zero to 60 Nm; the motor 202 torque ramps from 50 Nm to zero; the driver accelerator command continues to increase; the vehicle continues to accelerate; the halfshaft torque follows the engine 200 torque; the vehicle velocity error goes to zero; the clutch 210 closes. Third gear operates as second gear. During the gear change from second to third the motor 202 torque rises to fill in during the gear shift.

During fourth gear operation the driver stops commanding vehicle acceleration; the throttle angle decreases from 90 degrees to idle; the engine 200 speed decreases from about 3000 rpm to idle; the halfshaft torque shows a transition between positive torque to negative torque provided by regenerative braking; the engine 200 produces positive torque, transitions to negative brake torque, and then to idle torque; the motor 202 transitions from positive tractive torque to regenerative brake torque; the velocity error becomes negative; the clutch 210 does not fully engage, then disengages. When the engine 200 provides negative brake torque during the transition from positive torque to negative torque the clutch 210 is disengaged so that regenerative brake torque usage is optimized. During the beginning of fourth gear operation the driver is commanding over 80% throttle momentarily. During this time the motor 202, after providing fill in torque during the gear shift from three to four, provides torque boost.

The vehicle decelerates to a stop; the throttle angle remains at idle; the vehicle speed remains at idle; the gear changes from four to one even though the clutch 210 is disengaged such that the gear would be appropriate if the driver suddenly commanded acceleration; the halfshaft torque becomes zero, when regenerative brake torque can no longer be collected, leaving the hydraulic brakes to continue the task of vehicle deceleration alone; the engine 200 torque is zero the motor 202 torque goes to zero when regenerative braking is completed; the accelerator pedal 220 remains untouched by the driver; the vehicle velocity error goes to zero; the clutch 210 remains disengaged. The vehicle again accelerates upon driver request in a similar manner.

Medium Acceleration/Deceleration Hybrid Operation.

FIG. 14 shows simulation results of medium acceleration/deceleration hybrid operation. The operation in this profile is similar to the previous profile with the exception that more motor 202 boost occurs due to increased acceleration demand. The motor 202 boost operation can be noted in gears three and four. Additionally the vehicle gets into fifth gear.

Repeated Wide Open Throttle Acceleration/Deceleration Hybrid Operation.

During WOT operation, shown in FIG. 15 first gear behavior is as previously described. During second, third and fourth gears the driver is commanding full motor 202 and engine 200 torque; the vehicle is accelerating; full throttle is commanded and drops to idle during gear changes; halfshaft torque decreases with increasing gear due to motor 202 torque capability being limited as motor 202 speed increases and gear ratio decreases with increasing gear; vehicle velocity error remains approximately constant; the clutch 210 does not completely engage.

During fifth gear the vehicle cruises and this is reflected in a reduced throttle angle. The engine 200 speed remains steady during cruising; the halfshaft torque remains steady during cruising; the engine 200 torque remains steady during cruising; the motor 202 torque remains zero during cruising; the driver command is small during cruising; the clutch 210 engages and remains engaged during cruising. The vehicle decelerates and the behavior is as previously described during deceleration. The acceleration and deceleration scenario is repeated.

Engine 200 Only Simulation.

The first engine 200 only simulation is with 60% accelerator pedal 220 depression shown in FIGS. 16A–F. The vehicle accelerates in first gear; the throttle angle increases from idle to 80 degrees; the vehicle speed increases from idle to 3500 rpm; the halfshaft torque increases from zero to 800 Nm and reaches steady state of 400 Nm; the engine 200 torque increases from zero to 100 Nm. The clutch 210 disengages during gear changes; the engine 200 speed decreases; the halfshaft torque decreases; the engine 200 torque decreases. The remaining gears demonstrate similar behavior.

Motor 202 Only Simulation.

The simulation of motor 202 only shown in FIGS. 17A–J demonstrates the vehicle accelerating; the throttle angle at idle; the engine 200 speed at idle; the gears changing; smooth halfshaft torque; zero engine 200 torque; motor 202 torque increasing and decreasing with vehicle speed; accelerator pedal 220 command; small vehicle velocity error; a disengaged clutch 210.

Operational Review of Torque Distribution of a Preferred Embodiment Post-Transmission PHEV 1. The PHEV coordinated controller provides motoring and regenerative commands to the motor controller 215 for corresponding positive and negative motor 202 torque, and throttle blade commands to the engine controller 217. These commands may be based on th battery SOC, motor 202 speed versus torque limits, motor 202 torque current, motor 202 field current, transmission gear, driver pedal position, engine clutch 210 state, motor clutch 225 state, engine 200 speed, average power a the drive wheels 204, shift status, estimated engine 200 torque, and estimated engine 200 torque available.

2. The PHEV controller provides engine clutch 210 control during braking, or hybrid operation.

3. The torque may be partitioned to operate in an engine 200 only mode, a motor 202 only mode, or a two traction device (hybrid) mode.

4. Hybrid mode operation consists of motor 202 only operation, engine 200 operation, motor 202 torque application during shifting, motor 202 assist during power boost, and regenerative braking. During periods of low storage device operation, the engine 200 may be loaded with the alternator to increase the storage device operation.

5. The vehicle launches in motor 202 only mode for optimal drivability, emissions, and fuel economy.

6. A torque split algorithm determines the magnitudes of the motor 202 torque command and the engine 200 torque command.

7. The torque split algorithm determines the accelerator pedal 220 command from the driver and determines the torque partitioning between the traction devices.

8. The torque split algorithm for pre-transmission PHEV contains seventeen inputs:
   a. Motor202TQ Estimate in Nm
   b. brake224switch logic
   c. accelerator position in per unit values (0—no pedal command to 1—WOT)
   d. Maximum Engine 200 Torque Available at the Wheels 204 (TeMAXavailATwheels204) in Nm
   e. accel pedal flag logic
   f. motor 202 only trigger logic
   g. Engine 200 Torque at the Wheels 204 (TeATwheels204) in Nm
   h. engine 200 on c logic
   i. engine 200 on and shift b logic
   j. motor 202 assist no shift engine 200 on d logic
   k. gear ratio
   l. motor 202 only flag a logic
   m. motor 202 assist with shift flag e logic
   n. Maximum Motor 202 Torque Available at the Wheels 204 (TmATwheels204MAX) in Nm
   o. actual gear
   p. clutch 210 position logic
   q. clutch 210 state logic 9. The torque split algorithm contains two outputs: (a) Te command at engine 200 in Nm; (b) torque command at motor 202 in Nm.

10. When the vehicle is launched in motor 202 only mode, the amount of motor 202 torque commanded is a linear function based on the maximum motor 202 torque available at any instant and the percentage of accelerator pedal 220 depressed.

11. This vehicle is capable of operating in a motor 202 only, engine 200 only or hybrid mode. Any mode that the driver chooses to operate the vehicle is transparent. The pedal interface between the driver and the vehicle is invisible to the driver.

12. When the vehicle is operated in the hybrid mode and the vehicle transitions from motor 202 only mode to engine 200 on mode, the torque commanded by the driver at this transition is commanded initially to the motor 202.

13. When the vehicle transitions from motor 202 only to engine 200 on operation the motor 202 torque commanded must be saved at the exact accelerator pedal 220 position command from the driver during the transition.

14. This saved motor 202 torque command and pedal position is used to scale that pedal position to 80% of pedal travel.

15. The maximum engine 200 torque available at the wheels 204 corresponds to 80% accelerator pedal 220 travel.

16. The difference between 80% of pedal travel and the saved percentage of pedal travel is used as a linear function with maximum engine 200 torque available, to command the engine 200 torque.

17. The remaining 20% of pedal travel is used as a linear function with the maximum motor 202 torque available, to provide boost.

18. At 80% accelerator pedal 220 travel no motor 202 torque is commanded, and at 100% accelerator pedal 220 travel the maximum motor 202 torque available is commanded.

19. As the vehicle transitions from engine 200 operation to motor 202 only operation the engine 200 torque commanded at the transition and the accelerator pedal 220 position at the transition are saved.

20. These saved values are used to linearly scale the motor 202 torque command.

21. The motor 202 torque estimate is multiplied by gear ratios of transaxle and 4×4 to become the motor 202 torque at the wheels 204.

22. When the BRAKE SWITCH is high the accelerator position ACCEL POS is continuously being updated and the motor202perACCpedalSAVE is zero. When the BRAKE SWITCH goes low the ACCEL POS accelerator position is no longer updated and the present value is saved as motor202perACCpedalSAVE. Similarly, TmATwheels204SAVE is saved. When the BRAKE SWITCH is low then motor202perACCpedalSAVE is zero. When the BRAKE SWITCH goes high, then the accelerator position is saved as motor202perACCpedalSAVE and the motor 202 torque is saved as TmATwheels204SAVE.

23. When the mtr only trigger is high the accelerator position ACCEL POS is continuously being updated and the TeperACCpedalSAVE is zero. When the mtr only trigger goes low the ACCEL POS accelerator position is no longer updated and the present value is saved as TeperACCpedalSAVE. Similarly, TeATwheels204SAVE is saved. When the mtr only trigger is low then TeperACCpedalSAVE is zero. When the mtr only trigger goes high, then the accelerator position is saved as TeperACCpedalSAVE and the engine 200 torque is saved as TeATwheels204SAVE.

24. When not in motor 202 only trigger mode the engine 200 torque command is derived by subtracting the motor 202 accelerator percent pedal saved from the present accelerator pedal 220 value. This difference is the amount of extra pedal desired from the driver.

25. The difference between the maximum engine 200 torque available at the wheels 204 and the motor 202 torque saved at the wheels 204 gives the engine 200 torque available for scaling.

26. The difference between the 80% tip in value and the percent motor 202 accelerator pedal 220 saved determines the available percentage of the pedal for scaling.

27. The engine 200 torque available multiplied with the amount of extra accelerator pedal 220 desired divided by the percent of accelerator pedal 220 scaled gives the engine 200 torque commanded referred to the wheels 204.

28. The absolute value of the engine 200 torque commanded at the wheels 204 is taken and multiplied by the sign of the amount of extra accelerator pedal 220 desired.

29. The motor 202 torque saved at the wheels 204 is then added to the engine 200 torque command when the accelerator pedal 220 is depressed.

30. When the amount of extra (torque) desired is negative, the accelerator position is less than the torque motor 202 per accelerator pedal 220 saved. When this occurs, the present accelerator position multiplied by the motor 202 torque saved at the wheels 204 divided by the percent motor 202 accelerator pedal 220 saved. This then is the engine 200 torque command else the previous engine 200 torque command is issued.

31. When the motor 202 only trigger is high after being low the motor 202 torque command is the present accelerator position multiplied by the engine 200 torque at the wheels 204 saved divided by the engine 200 torque per accelerator pedal 220 saved.

32. If the transmission is in neutral, then the engine 200 torque command is zero.

33. The engine 200 torque command at the engine 200 becomes the engine 200 torque commanded at the wheels 204 divided by the gear ratio and the final drive.

34. If a motor 202 assist non shifting mode is desired then the maximum engine 200 torque available at the wheels 204 is commanded. This occurs when the accelerator pedal 220 position is greater than 80%.

35. The motor 202 torque commanded at the motor 202 is that motor 202 torque commanded at the wheels 204 divided by the 4×4 and transaxle gear ratios and filtered with a low pass filter.

36. If the brake switch is high the torque command at the motor 202 is zero in this part of the algorithm.

37. If the engine 200 clutch 210 is being commanded to engage and the clutch 210 is open and the transmission is in second gear then the motor 202 torque commanded at the wheels 204 is 30 Nm*4×4 and transaxle gear ratios. This is done in order to allow quicker engine 200 clutch 210 engagement to occur.

38. If the motor 202 only flag, the motor 202 assist with shift flag or the engine 200 on and shift b flags are high then the motor 202 torque commanded at the wheels 204 is the acceleration position multiplied by the maximum motor 202 torque at the wheels 204.

39. Else if the motor 202 assist with no shift is high then the motor 202 torque commanded at the wheels 204 is the difference between the present acceleration position and 80% of the pedal travel multiplied by the maximum motor 202 torque available at the wheels 204 divided by 20% of the pedal travel.

40. Else if the motor 202 only flag is high after previously being in a state where motor 202 only flag, or motor 202 assist with shift flag, or engine 200 on and shift flag, or motor 202 assist with no shift flag, was high then the motor 202 torque command at wheels 204 is the acceleration position multiplied by the engine 200 torque at the wheels 204 saved divided by the engine 200 torque percent accelerator pedal 220 saved. It is apparent to those skilled in the art that the present invention and method of utilization thereof can be readily utilized in vehicles having a pre-transmission parallel vehicle configuration or in vehicles where different drive axles are powered by the electric and IC engine 200. In such vehicles, many of the parameters of the aforementioned are reduced or eliminated. However, the basic strategy of saving the torque demand on the electric motor 202 when transitioning to the IC engine 200 remains the same as well as the parameters in scaling the accelerator pedal 220. Accordingly, other inputs to the aforementioned algorithm can be reduced or modified. However, the maximum engine 200 torque will be set at the 80% preferred value as previously described.

It is apparent to those skilled in the art that the present invention and method of utilization thereof can be readily utilized in vehicles having a pre-transmission parallel vehicle configuration or in vehicles where different drive axles are powered by the electric and IC engine 200. In such vehicles, many of the parameters of the forementioned are reduced or eliminated. However, the basis strategy of saving the torque demand on the electric motor 202 when transitioning to the IC engine 200 remains the same as well as the parameters in scaling the accelerator pedal 220. Accordingly, other inputs to the aforementioned algorithm can be reduced or modified. However, the maximum engine 200 torque will be set at the 80% preferred value as previously described.

What is claimed is:

1. A method of powering a hybrid electric vehicle with an electric motor and an internal combustion engine wherein in normal operation said vehicle is powered solely by said electric motor at start up to a first vehicle operational parameter level, and thereafter said electric motor does not power said vehicle until a torque demand for said vehicle is beyond a predefined percentage of a maximum internal combustion engine torsional output, said method comprising:

powering said vehicle by an electric motor up to said first vehicle operational parameter level;

powering said vehicle with an internal combustion engine beyond said first vehicle operational parameter level;

determining a torque level of said motor at said first vehicle operational parameter level;

determining an accelerator pedal travel first position at said first vehicle operational parameter level;

fixing a predefined percentage of a maximum engine torsional output to a predefined accelerator pedal travel second position; and scaling said accelerator pedal travel by a first predefined functional relationship from said accelerator pedal travel first position to said accelerator pedal travel second position.

2. A method of powering a hybrid electric vehicle as described in claim 1, wherein said first predefined functional relationship is linear.

3. A method of powering a hybrid electric vehicle as described in claim 1, wherein said predefined percentage of maximum engine torsional output is approximately between 95% to 100%.

4. A method of powering a hybrid electric vehicle as described in claim 3, wherein said predefined percentage of maximum engine torsional output is approximately 100%.

5. method of powering a hybrid electric vehicle as described in claim 1, wherein said predefined accelerator pedal travel second position is approximately between 75% to 85%.

6. A method of operating a hybrid electric vehicle as described in claim 5, wherein said predefined accelerator pedal travel second position is approximately 80%.

7. A method of powering a hybrid electric vehicle as described in claim 1, wherein a maximum motor torque available is determined on an instantaneous basis and wherein when said accelerator pedal is moved beyond said accelerator pedal travel second position said motor additionally supplies boost torque to power said vehicle and wherein said boost torque supplied by said electric motor is scaled by a second predefined functional relationship between said accelerator pedal travel second position and a maximum accelerator travel position.

8. A method as described in claim 7, wherein said second predefined functional relationship is linear.

9. A method of powering a hybrid electric vehicle as described in claim 1, further including powering said vehicle with said electric motor after said vehicle returns from a vehicle operational parameter level above said first level to a vehicle operational parameter level below said first level and determining an accelerator pedal travel third position when said vehicle returns below said first vehicle operational parameter level and determining an instantaneous maximum torque level of said motor and scaling said accelerator pedal from said accelerator pedal travel third position to a fixed third predefined percentage of accelerator pedal travel based on a third predefined percentage of said maximum motor torque available by a third predefined functional relationship.

10. A method as described in claim 9, wherein said third predefined functional relationship is linear.

11. A method as described in claim 9, wherein said third predefined percentage of accelerator pedal travel position is between 0–5%.

12. A method as described in claim 11, wherein said third predefined percentage of accelerator pedal travel is 0%.

13. A method as described in claim 1, wherein said first vehicle operational parameter level is primarily dependent upon a power demand of said vehicle.

14. A method of powering a hybrid electric vehicle as described in claim 1, wherein said electric motor and said internal combustion engine power a common drive axle of said vehicle.

15. A method of powering a hybrid electric vehicle with an electric motor and internal combustion engine comprising:

powering said vehicle by an electric motor up to a first vehicle operational parameter level;

powering said vehicle with an internal combustion engine beyond said first vehicle operational parameter level;

determining a torque level of said motor at said first vehicle operational parameter level;

determining an accelerator pedal travel first position at said first vehicle operational parameter level;

fixing a maximum engine torsional output to a predefined accelerator pedal travel second position which is between 75 to 85% maximum accelerator pedal travel;

linearly scaling said accelerator pedal from said accelerator pedal travel first position to said accelerator pedal travel second position; and determining a maximum of motor torque available in an instantaneous manner and linearly scaling said accelerator pedal relationship from said accelerator pedal travel second position to a maximum accelerator travel position to add boost torque to said vehicle from said motor.

16. A method of powering a hybrid electric vehicle as described in claim 15, additionally including powering said vehicle with said electric motor when said vehicle returns from a vehicle operational parameter level above said first level, to a vehicle operational parameter level below said first level and determining an accelerator pedal travel third position when said vehicle returns below said first vehicle operational parameter level and determining instantaneous maximum torque level of said motor and scaling said accelerator pedal from said accelerator pedal travel third position to a zero accelerator travel pedal position based on a linear scaling of said maximum motor torque available.

17. A hybrid electric vehicle comprising:

an electric motor for generally powering said vehicle from start up to a first vehicle operational parameter level when said vehicle is in a hybrid operational mode, said electric motor shutting off when said vehicle is powered beyond said first vehicle operational level;

an internal combustion engine for powering said electric vehicle beyond said first vehicle operational parameter level when said engine is in a hybrid operational mode;

an accelerator pedal for demanding a torque output from said electric motor and/or said internal combustion engine when said vehicle is in a hybrid operational mode, said accelerator pedal having a non-constant travel first position at said first vehicle operational parameter level and a travel second position wherein a first predefined percentage of a maximum of torque output of said internal combustion engine is demanded, and wherein beyond said second position said accelerator pedal demands a torque output additionally from said electric motor;

a torque sensor for determining a torque level of said motor at said first vehicle operational parameter level;

an accelerator pedal travel sensor for determining said positions of said accelerator pedal; and a controller for scaling said accelerator pedal from said accelerator pedal travel first position to said accelerator pedal travel second position by a first predefined functional relationship.

18. A vehicle as described in claim 17, wherein said first predefined functional relationship is linear.

19. A vehicle as described in claim 18, wherein said first predefined percentage of maximum engine torque is approximately between 95% and 100%.

20. A vehicle as described in claim 19, wherein said predefined percentage of maximum engine torque is approximately 100%.

21. A vehicle as described in claim 17, wherein said accelerator pedal travel second position is approximately 75% to 85%.

22. A vehicle as described in claim 21, wherein said accelerator pedal travel second position is approximately 80%.

23. A vehicle as described in claim 17, wherein said torque sensor additionally determines maximum motor torque available on an instantaneous basis and wherein when said accelerator pedal is moved beyond said accelerator pedal travel second position, said motor additionally supplies boost torque to power said vehicle and wherein said boost torque is supplied by a second predefined functional relationship between said accelerator pedal travel second position and a maximum accelerator pedal travel position.

24. A vehicle as described in claim 17, wherein when said vehicle returns from a vehicle operational parameter level above said first vehicle operational parameter level to a vehicle operational parameter level below said first vehicle operational parameter level, said torque sensor determines an instantaneous maximum torque level of said motor, and said accelerator pedal travel sensor determines a third position of said accelerator pedal, and said controller scales said accelerator pedal from said third accelerator pedal travel position to a fixed third predefined percentage of accelerator travel pedal position based on a third predefined percentage of said maximum motor torque available by a third predefined functional relationship.

25. A vehicle as described in claim 24, wherein said third predefined functional relationship is linear.

26. A vehicle as described in claim 24, wherein said third predefined percentage of accelerator pedal travel position is between 0% and 5%.

27. A method as described in claim 26, wherein said third predefined percentage of accelerator pedal travel position is 0%.

28. A vehicle as described in claim 17, wherein said first vehicle operational parameter level is primarily dependent upon a power demand of said vehicle.

29. A vehicle as described in claim 17, wherein said electric motor and said internal combustion engine power a common drive axle of said vehicle.

30. A hybrid electric vehicle comprising:
an electric motor for powering said vehicle up to a first vehicle operational parameter level when said vehicle is in a hybrid operational mode;
an internal combustion engine for powering said electric vehicle beyond said first vehicle operational parameter level when said engine is in a hybrid operational mode;
an accelerator pedal for demanding a torsional output from said electric motor and/or said internal combustion engine when said vehicle is in a hybrid operational mode, said accelerator pedal having a non-fixed travel first position at said first vehicle parameter operational level and a fixed travel second position wherein a maximum of torsional output of said internal combustion engine is demanded and said accelerator pedal having a boost torque range beyond said travel second position wherein said motor supplies torque with said internal combustion engine and said accelerator pedal having a non-fixed travel third position wherein said vehicle moves below said first operational parameter level;
a torque sensor for determining a torque level of said motor at said accelerator pedal travel first and third positions and a maximum motor torque available at said accelerator pedal travel first, second and third positions;
an accelerator pedal travel sensor for determining said positions of said accelerator pedal; and
a controller for linearly scaling said accelerator pedal internal combustion engine torque output from said accelerator pedal travel first position to said accelerator pedal travel second position and said controller linearly scaling said accelerator pedal motor torsional output from said accelerator pedal second travel position to a maximum accelerator pedal travel position, and said controller linearly scaling said accelerator pedal torsional output of said motor from said accelerator pedal travel third position to a minimum accelerator pedal travel position.

31. A method of powering a hybrid electric vehicle with an electric motor and an internal combustion engine comprising:
powering said vehicle by an electric motor up to a first vehicle operational parameter level;
powering said vehicle with an internal combustion engine beyond said first vehicle operational parameter level;
determining a torque level of said motor at said first vehicle operational parameter level;
determining an accelerator pedal travel first position at said first vehicle operational parameter level;
fixing a predefined percentage of a maximum engine torsional output to a predefined accelerator pedal travel second position; and
scaling said accelerator pedal travel by a first predefined functional relationship from said accelerator pedal travel first position to said accelerator pedal travel second position; and
wherein a maximum motor torque available is determined on an instantaneous basis and wherein when said accelerator pedal is moved beyond said accelerator pedal travel second position said motor additionally supplies boost torque to power said vehicle and wherein said boost torque supplied by said electric motor is scaled by a second predefined functional relationship between said accelerator pedal travel second position and a maximum accelerator travel position.

32. A method as described in claim 31, wherein said second predefined functional relationship is linear.

33. A method of powering a hybrid electric vehicle as described in claim 31, further including powering said vehicle with said electric motor after said vehicle returns from a vehicle operational parameter level above said first level to a vehicle operational parameter level below said first level and determining an accelerator pedal travel third position when said vehicle returns below said first vehicle operational parameter level and determining an instantaneous maximum torque level of said motor and scaling said accelerator pedal from said accelerator pedal travel third position to a fixed third predefined percentage of accelerator pedal travel based on a third predefined percentage of said maximum motor torque available by a third predefined functional relationship.

34. A method as described in claim 33, wherein said third predefined functional relationship is linear.

35. A method as described in claim 33, wherein said third predefined percentage of accelerator pedal travel position is between 0–5%.

36. A method as described in claim 35, wherein said third predefined percentage of accelerator pedal travel is 0%.

* * * * *